United States Patent
Veltman

(10) Patent No.: US 11,365,620 B2
(45) Date of Patent: Jun. 21, 2022

(54) METHOD OF AND A DEVICE FOR ESTIMATING DOWN HOLE SPEED AND DOWN HOLE TORQUE OF BOREHOLE DRILLING EQUIPMENT WHILE DRILLING, BOREHOLE EQUIPMENT AND A COMPUTER PROGRAM PRODUCT

(71) Applicant: ENGIE ELECTROPROJECT B.V., RH Amsterdam (NL)

(72) Inventor: Andre Veltman, BW Culemborg (NL)

(73) Assignee: ENGIE ELECTROPROJECT B.V., RH Amsterdam (NL)

( * ) Notice: Subject to any disclaimer, the term of this patent is extended or adjusted under 35 U.S.C. 154(b) by 692 days.

(21) Appl. No.: 16/305,381

(22) PCT Filed: May 30, 2017

(86) PCT No.: PCT/NL2017/050348
§ 371 (c)(1),
(2) Date: Nov. 28, 2018

(87) PCT Pub. No.: WO2017/209607
PCT Pub. Date: Dec. 7, 2017

(65) Prior Publication Data
US 2020/0325763 A1   Oct. 15, 2020

(30) Foreign Application Priority Data

May 30, 2016   (NL) ..................................... 2016859

(51) Int. Cl.
*E21B 44/04*   (2006.01)
*G05B 15/02*   (2006.01)
(Continued)

(52) U.S. Cl.
CPC .............. *E21B 44/04* (2013.01); *G05B 15/02* (2013.01); *G06F 17/16* (2013.01); *E21B 45/00* (2013.01);
(Continued)

(58) Field of Classification Search
CPC ...... E21B 44/04; E21B 2200/20; E21B 45/00; E21B 47/12; G05B 15/02; G05B 2219/45208; G06F 17/16
See application file for complete search history.

(56) References Cited

U.S. PATENT DOCUMENTS

| 5,117,926 A | 6/1992 | Worrall et al. |
| 5,721,376 A | 2/1998 | Pavone et al. |

(Continued)

FOREIGN PATENT DOCUMENTS

| WO | 2010/063982 A1 | 6/2010 |
| WO | 2013/062409 A1 | 5/2013 |

(Continued)

OTHER PUBLICATIONS

Kyllingstad et al. "A New Technique for Calculating Downhole Rotation Speed and Torque from Surface Measurements". SPE/IADC-173042-MS. Mar. 17-19, 2015. 15 Pages. (Year: 2015).*

(Continued)

*Primary Examiner* — Eunhee Kim
(74) *Attorney, Agent, or Firm* — Steinfl + Bruno, LLP

(57) ABSTRACT

A method of and a device, borehole drilling equipment and a computer program product for estimating at least one of down hole speed and down hole torque of borehole drilling equipment while drilling a borehole in an earth formation. The borehole equipment comprising a rotational drive system, a drill string, a bottom hole assembly comprising a drill bit, a top end coupled to the rotational drive system, and a speed controller arranged for controlling rotational top end (Continued)

drive speed by commanding a top end drive torque. The method being performed in a computer based on a two-port spectral domain transfer matrix computational model of the borehole drilling equipment. While drilling, rotational top end drive speed and top end drive torque are obtained and down hole speed and down hole torque of the borehole drilling equipment are calculated by reducing spectral bandwidth of and applying a time delay term to the calculations enabling a causal time domain solution.

20 Claims, 12 Drawing Sheets

(51) Int. Cl.
  *G06F 17/16* (2006.01)
  *E21B 45/00* (2006.01)
  *E21B 47/12* (2012.01)

(52) U.S. Cl.
  CPC ........... *E21B 47/12* (2013.01); *E21B 2200/20* (2020.05); *G05B 2219/45208* (2013.01)

(56) References Cited

U.S. PATENT DOCUMENTS

| | | | |
|---|---|---|---|
| 6,662,110 | B1 | 12/2003 | Bargach et al. |
| 8,689,906 | B2 | 4/2014 | Nessjoen et al. |
| 9,482,083 | B2 | 11/2016 | Doris et al. |
| 9,708,900 | B2 | 7/2017 | Veltman et al. |
| 10,138,721 | B2 | 11/2018 | Veltman |
| 2003/0015320 | A1 | 1/2003 | Crossley et al. |
| 2004/0078129 | A1 | 4/2004 | Matsuno et al. |
| 2004/0245017 | A1 | 12/2004 | Chen et al. |
| 2011/0106514 | A1 | 5/2011 | Omeragic et al. |
| 2011/0147083 | A1 | 6/2011 | Mauldin et al. |
| 2011/0153296 | A1 | 6/2011 | Sadlier et al. |
| 2011/0232966 | A1* | 9/2011 | Kyllingstad ........ E21B 41/0092 175/24 |
| 2011/0280104 | A1 | 11/2011 | McClung, III et al. |
| 2012/0181084 | A1 | 7/2012 | Pilgrim et al. |
| 2012/0255778 | A1 | 10/2012 | Reckmann et al. |
| 2014/0284105 | A1 | 9/2014 | Veltman et al. |
| 2015/0322766 | A1 | 11/2015 | Veltman et al. |

FOREIGN PATENT DOCUMENTS

| | | |
|---|---|---|
| WO | 2014/098598 A1 | 6/2014 |
| WO | 2017/209607 A1 | 12/2017 |

OTHER PUBLICATIONS

International Preliminary Report on Patentability for International Application No. PCT/NL2012/050739 filed Oct. 24, 2012 on behalf of Cofely Experts B.V. dated Apr. 29, 2014. 5 pages.
International Preliminary Report on Patentability for International Application No. PCT/NL2017/050348 filed May 30, 2017 on behalf of ENGIE ELECTROSPROJECT B V, dated Dec. 4, 2018. 8 pages.
Halsey, G.W., et al. "Torque Feedback Used to Cure Slip-Slick Motion", *63rd Annual Technical Conference and Exhibition of the Soceity of Petroleum Engineers*, SPE 18049, 277-282, (Oct. 1988). 3 pages.
International Search Report for International Application No. PCT/NL2012/050739 filed Oct. 24, 2012 on behalf of Cofely Experts B.V. dated Jan. 15, 2013. 4 pages.
International Search Report for International Application No. PCT/NL2013/050923 filed Dec. 20, 2013 on behalf of Cofely Experts B.V. dated Feb. 17, 2014. 2 pages.
International Search Report for International Application No. PCT/NL2017/050348 filed May 30, 2017 on behalf of ENGIE ELECTROSPROJECT B V, dated Sep. 7, 2017. 4 pages.
Kyllingstad, A., et al. "Hardware-in-the-loop Simulations Used as a Cost Efficient Tool for Developing an Advanced Stick-Slip Prevention System", 2010 IADC/SPE Drilling Conference and Exhibition, vol. IADC/SPE, No. 128223, 1-13, (Feb. 2010). 14 pages.
Non-Final Office Action for U.S. Appl. No. 14/354,101, filed Apr. 24, 2014 on behalf of ENGIE ELECTROPROJECT B.V. dated Jan. 25, 2017. 21 pages.
Non-Final Office Action for U.S. Appl. No. 14/653,827, filed Jun. 18, 2015 on behalf of Cofely Experts B.V. dated Sep. 1, 2016. 13 pages.
Notice of Allowance for U.S. Appl. No. 14/653,827, filed Jun. 18, 2015 on behalf of Cofely Experts B.V. dated Apr. 11, 2017. 7 pages.
Rudat, J., et al, "Development of an Innovative Model-Based Stick/Slip Control System", *2011 SPE/IADC Drilling Conference and Exhibition*, vol. SPE/IADC, No. 139996, 1-3, (Mar. 2011). 4 pages.
Final Office Action for U.S. Appl. No. 14/354,101, filed Apr. 24, 2014 on behalf of ENGIE ELECTROPROJECT B.V. dated Oct. 16, 2017. 29 pages.
International Preliminary Report on Patentability for International Application No. PCT/NL2013/050932 filed Dec. 20, 2013 on behalf of Cofely Experts B.V. dated Jun. 23, 2015. 8 pages.
Notice of Allowance for U.S. Appl. No. 14/354,101, filed Apr. 24, 2014 on behalf of ENGIE ELECTROPROJECT B.V., dated Jul. 25, 2018. 12 pages.
Veltman, A. "Identification While Drilling of Drill-String Dynamic Model for Diagnostics and Optimization", *Offshore Technology Conference 2015, The Atlantic: From East to West—An Ocean of Innovation*, vol. 1, 512-524, (Oct. 2015). 14 pages.
Written Opinion for International Application No. PCT/NL2012/050739 filed Oct. 24, 2012 on behalf of Cofely Experts B.V. dated Jan. 15, 2013. 6 pages.
Written Opinion for International Application No. PCT/NL2013/050923 filed Dec. 20, 2013 on behalf of Cofely Experts B.V. dated Feb. 17, 2014. 7 pages.
Written Opinion for International Application No. PCT/NL2017/050348 filed May 30, 2017 on behalf of ENGIE ELECTROSPROJECT B V, dated Sep. 7, 2017. 4 pages.

* cited by examiner

METHOD OF AND A DEVICE FOR ESTIMATING DOWN HOLE SPEED AND DOWN HOLE TORQUE OF BOREHOLE DRILLING EQUIPMENT WHILE DRILLING, BOREHOLE EQUIPMENT AND A COMPUTER PROGRAM PRODUCT

CROSS REFERENCE TO RELATED APPLICATIONS

The present application is the US national stage of International Patent Application no. PCT/NL2017/050348 filed on May 30, 2017 which, in turn, claims priority to Dutch Patent Application no. 2016859 filed on May 30, 2016.

TECHNICAL FIELD

The present disclosure generally relates to the drilling of boreholes in an earth formation. More specifically, the present disclosure relates to a method of and a device for estimating at least one of down hole speed and down hole torque along the drill string and drill bit of borehole drilling equipment, in particular while drilling a borehole in an earth formation, as well as borehole equipment equipped with the method and/or the device, and a computer program product to carry out the method by a computer or computer system.

BACKGROUND

The term borehole generally designates the result of a drilling operation in the earth, either vertically, horizontally and/or deviated using a drill string having a drill bit at its lower end. At its upper end or top end, the drill string is driven by a drive system at the earth surface or the sea surface, called a top drive or rotary table. The top drive or rotary table is driven by an electric motor, or any other type of drive motor, providing a rotational movement to the drill bit in the borehole.

Typically, the drill string is a structure of a plurality of tubulars or pipes, threadedly connected to each other. A typical drill string may have a length of several hundreds or thousands of meters.

The lower part of the drill string is called the Bottom Hole Assembly, BHA, at which the cutting tool for drilling the borehole, also called the drill bit, connects.

The drill string is hollow, such that drilling fluid can be pumped down towards the bottom hole assembly and through nozzles in the bit, for lubrication purposes. The drilling fluid is circulated back up the annulus, i.e. the space between the outer circumference of the drill string and the borehole wall, to transport cuttings from the drill bit to the earth surface.

A borehole may be drilled for many different purposes, including the extraction of water or other liquid (such as oil) or gases (such as natural gas and shale gas), as part of a geotechnical investigation, making use of geothermal energy, environmental site assessment, mineral exploration, temperature measurement or as a pilot hole for installing piers or underground utilities, for example.

The bottom hole assembly is rigid in torsional direction as it is relatively short and thick-walled. In use, the bottom hole assembly experiences lateral deflections due to compressive force. The drill string is a slender and flexible structure due to its long length and relative small wall thickness. During drilling, numerous vibrations in the borehole equipment and, in particular, in the drill string, are generated. In a rotary drill string and bottom hole assembly, torsional, axial or longitudinal and lateral vibrations may occur.

In general, axial vibrations may cause bit bounce, which may damage bit cutters and bearings. Lateral vibrations may be very destructive and may create large shocks as the bottom hole assembly impacts the wall of the borehole. Lateral vibrations may drive the system into backward whirl, creating high-frequency large-magnitude bending moment fluctuations, resulting in high rates of component and connection fatigue. Imbalance in an assembly may cause centrifugally induced bowing of the drill string, which may produce forward whirl and results in one-sided wear of components. Torsional vibrations result, among others, from oscillations of the drill string alongside the borehole and may originate from stick-slip. Drill string dysfunctions may reduce the energy transfer between the surface and bit, increase metal fatigue, increase premature bit wear, decrease the rate of penetration, and may cause bore hole damage.

Stick-slip is a phenomenon caused by frictional forces between surfaces of the drill bit and/or the drill string contacting the earth formation surface or the inner wall surface of the borehole. The surfaces of the drill bit and/or the drill string on the one hand and the surfaces of the earth formation and borehole on the other hand, alternatingly may stick to each other or slide over each other, with a corresponding change in the force of friction.

In practice, this friction force shows a non-linear behaviour and, in most cases, the friction may become so large that the drill bit, i.e. the bottom hole assembly, temporarily comes to a complete standstill, called the stick mode. During the stick mode, the continuing rotational drive speed or motion of the drive system winds-up the drill string. If the torque build-up in the drill string is large enough to overcome the static friction, the bottom hole assembly starts rotating again, called the slip mode. This, however, may cause a sudden jump or a stepwise increase in the angular acceleration of the movement of the drill bit, inter alia in that the dynamic friction encountered by the drill string and bottom hole assembly is less than the static friction, and may result in excessive wear thereof. Stick and slip modes may follow each other rather quickly in a regular, periodic manner. During stick-slip drilling, penetration rates are low and the bit wears faster.

The above-mentioned phenomena, in one way or another, negatively affect the performance of the drilling process, such that a planned drilling operation may be delayed over as much as a few days, for example when stick-slip occurs, with a risk of penalty fees and the like.

For mitigating the impact of torsional vibrations and resonance in the drill string and the occurrence and impact of stick-slip operation and oscillations, the rotational drive speed of and torque applied by the drive system of the borehole equipment is, among others, controlled by a speed controller, the parameters of which are set and tuned to the relevant operational parameters of the borehole equipment. The term "mitigating" has to be construed to include controlling, alleviating, reducing, soften, tempering, relieving, and like meanings, up to and including avoiding torsional vibrations and stick-slip oscillations.

The operational parameters of the borehole equipment depend on the mechanical properties of the top end drive or surface drive, the bottom hole assembly and the string geometry, i.e. specific mass and shear modulus of the pipe material, viscous borehole wall damping, etc.

As drilling progresses, the string geometry and mechanical properties of the tubulars of the drill string change due to the lengthening of the drill string and/or changes in the bottom hole assembly. As will be appreciated, each time when extending the drill string, for example by a stand comprising several joints of drill pipe, the dynamics of the borehole equipment change. In practice, this may necessitate to retune the parameters of the speed controller approximately every 100 to 200 m of drilling, for example.

While drilling commences, friction experienced by the drill string, such as by mechanical contact of the drill string with the inner wall of the borehole, may likewise change during operation due to changes in the material composition of the earth formation in which the borehole is drilled, or in that the borehole is deviated from a vertical to a horizontal position, for example, or to a position in between these two extremes.

In practice, the string geometry parameters or dynamic properties of the drill string may be provided manually by the driller by entering, via a keypad of an input/output interface of the speed controller, for example, the inner and outer diameters and length of the drill string tubulars or pipes, and the drill collars of the bottom hole assembly at which the drill bit rests, taken from a spread-sheet or the like. It will be appreciated that, instead of entering the mechanical properties of the borehole equipment itself, one may enter the values of the parameters of the speed controller from a spread-sheet or table or the like, already calculated based on a particular drill string geometry used.

Alternatively, for example, the string geometry parameters may be obtained without the intervention of an operator or other skilled personnel, by the method and device as disclosed in the International Patent Application WO2014/098598, filed in the name of applicant. With this method and device, while drilling commences, a relevant representative dynamic model of the borehole equipment, in particular of the drill string and bottom hole assembly, can be revealed completely automatically and autonomously.

While information about the mechanical behavior of the drill bit or bottom hole assembly and the drill string, during drilling, is of utmost importance to the driller for optimizing the drilling process, the retrieval of this information in real time or near real time poses a big problem to be solved, as these parts of the borehole equipment are sub-surface, i.e. down hole, and not visible or otherwise easily accessible for applying measurements.

The term down hole as used in the present description and the appending claims generally refers to any position in a drilled borehole and is not to be construed as being limited to the bottom end of the borehole.

In practice, real time or near real time measurement data of down hole borehole equipment while drilling, also known as Measurement While Drilling, MWD, are gathered by measurement devices located in the BHA, such as electro-mechanical directional sensors, various strain gauges, temperature sensors and accelerometers which measure axial, torsional, and transversal accelerations, tension, torque, temperature, and rotational speed of the BHA. Mud-pulse telemetry is the standard method in commercial MWD and Logging While Drilling, LWD, systems, for exchanging the down hole data with processing equipment at the earth surface where the data can be processed and graphically displayed on a computer screen in the drilling dynamics cabin on the rig, for example.

MWD and LWD measurement devices in the BHA need to be very robust as same must all remain reliable in harsh conditions because the BHA, in use, is exposed to strong bouncing and vibrating forces, which makes this type of equipment rather expensive. Modern MWD tools are generally designed to withstand shocks of approximately 500 G for 0.5 ms over a life of 100,000 cycles. Torsional shock, produced by stick/slip torsional accelerations, may also be significant. If subjected to repeated stick/slip, tools can be expected to fail.

Further, MWD systems typically have a power supply, such as a battery and drilling-fluid turbine. A combination of these two types of power systems is used to provide power to the MWD tool to avoid power interruptions during intermittent drilling-fluid flow conditions, for example. Batteries can provide this power independent of drilling-fluid circulation, however batteries have a limited life time.

Lithium-thionyl chloride batteries are commonly used in MWD systems because of their excellent combination of high-energy density and superior performance at MWD service temperatures. Although these batteries are safe at lower temperatures, if heated above 180° C., they can undergo a violent, accelerated reaction and explode with significant force. Even though these batteries are very efficient over their service life, they are not rechargeable, and their disposal is subject to strict environmental regulations.

Turbines driving an electric generator must accept a wide range of flow rates to accommodate all possible mud-pumping conditions and must be capable of tolerating considerable debris and lost-circulation material entrained in the drilling fluid.

Acoustic systems that transmit up the drill pipe suffer strong attenuation in the drilling fluid and a limited data rate exchange, which possess a severe limitation for applying more accurate measurement devices necessitating higher bit transmission rates, for example. Signal noise caused by the mud pumps and drilling motor require sophisticated filtering techniques to acquire the data gathered.

In practice, among others for optimally controlling a drilling operation by borehole equipment, both from a technical and an economical point of view, there is a need for providing real time or near real time information about the dynamical behavior of the drill bit, bottom hole assembly and the drill string, during drilling, not suffering from the disadvantageous of the traditional MWD as elucidated above.

SUMMARY

It is an objective to propose a method and device for providing real time or near real time information about the down hole dynamical behavior of borehole drilling equipment while drilling a borehole in an earth formation.

It is another objective to provide borehole equipment for drilling a borehole in an earth formation operating with such method and/or equipped with such device.

In a first aspect there is provided a method of estimating at least one of down hole speed and down hole torque of borehole drilling equipment while drilling a borehole in an earth formation. The borehole drilling equipment comprises a rotational drive system, a drill string having a bottom hole assembly comprising a drill bit and a top end coupled to the rotational drive system, and a speed controller arranged for controlling rotational top end drive speed by commanding a top end drive torque.

The method being performed in a computer and comprises the steps of:
  obtaining transfer matrix components of a two-port spectral domain transfer matrix computational model of the borehole drilling equipment, which computational model includes damping properties of the borehole drilling equipment, and wherein the down hole speed and down hole torque are dependent variables and the rotational top end drive speed and top end drive torque are independent variables;

obtaining, while drilling, the rotational top end drive speed and top end drive torque, and calculating, from the obtained transfer matrix components, the top end drive speed and the top end drive torque at least one of the down hole speed and down hole torque of the borehole drilling equipment, wherein the step of calculating comprises:

reducing spectral bandwidth of the calculation, the reduced bandwidth being selected to include a limited number of higher order spectral modes in the calculation, applying, in the spectral domain, a time delay term to the calculation, the time delay term being selected to enable a causal time domain solution, and calculating at least one of the down hole speed and down hole torque of the borehole drilling equipment from applying the reduced bandwidth and added time delay term.

The method is based on the insight that the down hole dynamics of the borehole drilling equipment, comprised by the drill string, bottom hole assembly and drill bit, can be estimated using a two-port spectral domain transfer matrix computational model, in which the down hole speed and down hole torque are the dependent variables and the rotational top end drive speed and top end drive torque are the independent variables.

In order to numerically, i.e. by a computer, in particular a general purpose computer, calculate the down hole speed and/or down hole torque of the borehole drilling equipment, the calculations are modified by reducing the spectral bandwidth thereof, in order to constrain the calculations to a number of spectral modes including only such higher order modes relevant to meet a desired accuracy, computing stability and/or calculation time. The spectral bandwidth should not be reduced in a manner that the number of higher order spectral modes accounted for in a calculation are too less, such that a modelling error can become significant because the model does not express sufficient modes of vibration.

Further, to compensate in the time-domain for the limitation of the number of higher order modes, in the spectral domain, a time delay term is applied to each of the calculations for achieving the down hole speed and/or down hole torque, such to enable a causal time domain solution. That is to ensure that the calculated down hole speed and/or down hole torque are caused by the obtained rotational top end drive speed and top end drive torque. Or in other words, to ensure that the output at time t depends only on past inputs.

The downhole speed and/or down hole torque may be calculated from a matrix multiplication operation of the obtained top end drive speed and top end drive torque and the transfer matrix components, applying the bandwidth reduction and time delay term, and inverse spectral to time domain transformation.

The method provides a very powerful analysis tool for drilling operators as it becomes possible to calculate and simulate, automatically, from the two-port spectral domain transfer matrix computational model, using a computer, the operation of the drill bit and the drill string at each location in the borehole during an actual drilling operation, without the need for expensive and damage prone down hole measuring and data transmission equipment. Those skilled in the art will appreciate that, in practice, measuring the operation of the drill string along its length by implementing sensors along the drill string, for example, is technically not feasible.

The influence of a change in the drive speed at the top end on the actual operation of the drill bit can be reliably, automatically calculated and provided to the drilling operator for analysis, with an aim to constantly or continuously maximize the drilling efficiency, for example.

As the method can be performed while drilling commences, the speed controller can be automatically, essentially instantaneously, adapted and tuned to the relevant operational parameters of the borehole drilling equipment, among others for mitigating the impact of torsional vibrations and resonance in the drill string, by damping mechanical energy originating from the bottom hole assembly, and the occurrence and impact of stick-slip operation and oscillations.

The above method has been proven valid from experimental down hole field data obtained from several drilling rigs operative in practice.

In an example of the method, the spectral bandwidth reduction and the time delay term are applied by:

reducing spectral bandwidth of the transfer matrix components, the reduced bandwidth being selected to include a limited number of higher order spectral modes in the transfer matrix components, adding, in the spectral domain, a time delay term to each of the transfer matrix components, the time delay being selected to enable a causal time domain solution, and calculating at least one of the down hole speed and down hole torque of the borehole drilling equipment using the thus modified transfer matrix components.

Modifying the transfer matrix components is computationally advantageous in that the modified transfer matrix components, for a plurality of borehole positions, may be calculated in advance, i.e. before the rotational top end drive speed and top end drive torque are obtained.

The transfer matrix components including the modified transfer matrix components may take the form of transfer functions in the spectral domain. In an example of the method, time-domain equivalents of the down hole speed and down hole torque are calculated, by the computer, in a causal convolution operation by processing the obtained rotational top end drive speed and top end drive torque and impulse response functions of the modified transfer matrix transfer function components over a period of time including one round trip time in the drill string. That is back and forth the drill string length. The length of a round trip is related to the longitudinal speed of the oscillatory waves or vibrations travelling through the drill string. In practice, for an efficient numerical calculation, a time period of just a fraction longer than one round trip time is selected. For example a fraction of 10-20% of a round trip time.

While the impulse response functions only need to span a time length of a few seconds to fully describe the complete system, calculating down hole speed and/or down hole torque of the borehole drilling equipment from convolution operations is computationally very efficient, both in terms of processing power and processing time. As a result, the calculated down hole speed and down hole torque for each of a plurality of down hole positions—inclusive bit speed and bit torque—may be near real time presented while drilling.

The term impulse response or impulse response function refers to the behavior of a dynamic system in response to some external change and can be suitably synthesized from commercially available computer software. The impulse response function describes the behavior of the system in the time domain as a function of a brief input signal, called an impulse. The impulse may be modeled as a Dirac delta function for continuous-time systems, or as the Kronecker delta for discrete-time modelled systems. The impulse response is calculated from inverse spectral to time domain transformation of a spectral transfer function.

In an example, the calculated down hole speed and down hole torque for each of a plurality of down hole positions are presented at a display device in a spatial graphical diagram as a function of time and down hole position, in particular in a speed wave pattern or torque wave pattern diagram, for example.

The bandwidth reduction may be obtained by any suitable filter function and can be based on, for example, at least one of the damping properties and length of the drill string, such to include in the calculation only higher order spectral modes having a spectral power density above a selected value and/or a maximum number of higher order spectral modes, such as 10 or preferably up to 20 or more preferably up to 30 spectral modes above the fundamental mode, for example. In general, a bandwidth of 10 Hz or above is sufficient to provide accurate results in practice. Filter functions that are known in practice and may be considered for the purpose of the present disclosure are, among others, Butterworth, Chebyshev, Bessel and Gaussian filter functions.

In an example of the method, the spectral bandwidth is reduced by applying an $n^{th}$ order low-pass Bessel filter operation, wherein $n \geq 4$, or preferably $n \geq 10$ or more preferably $n \geq 20$, and tapering. The tapering, or windowing, is applied to zero-value the calculations, i.e. the transfer matrix components, in the spectral domain outside of a chosen interval, i.e. outside the window selected. For the purpose of alleviating the calculation of time-domain equivalents, a gradually decreasing tapering or window function is preferred, such as but not limited to, a cosine, a confined Gaussian, a Welch and a Lanczos window function or similar.

Adding a time delay term in the spectral domain has the effect of modifying the phase of the calculations, i.e. the transfer matrix components, and achieves a causal impulse response when transforming the thus modified calculations, i.e. the modified transfer matrix components, into time-domain equivalents, such as by inverse Laplace or inverse Fourier transformation, for example Inverse Fast Fourier Transformation, IFFT. In an example of the method, to each of the transfer matrix components a fixed time delay term may be added or the time delay term may be selected in function of the actual, momentarily or expected length of the drill string. In particular a time delay term which equals at least 1 sec per 3000 m of drill string length.

In a further example of the method, the time delay term added comprises a time delay part also representative of a time delay caused by the Bessel filter operation or any other selected filter function operative in the spectral domain. In practice this time delay term equals about 0.25 sec and depends on the order and bandwidth of the Bessel filter function selected.

In an example of the method, the two-port spectral domain transfer matrix computational model is represented by:

$$\begin{pmatrix} \omega_{dh} \\ T_{dh} \end{pmatrix} = \begin{bmatrix} M_{11}(s) & M_{12}(s) \\ M_{21}(s) & M_{22}(s) \end{bmatrix} \begin{pmatrix} \omega_{td} \\ T_{ref} \cdot e^{-s\tau_d} \end{pmatrix} \quad (1)$$

wherein: $M_{11}(s)$, $M_{12}(s)$, $M_{21}(s)$ and $M_{22}(s)$ represent bandwidth limited and time delay term modified spectral transfer matrix components and each component may represent a transfer function in the spectral domain, $\omega_{dh}$ represents down hole speed being a dependent variable, $T_{dh}$ represents down hole torque being a dependent variable, $\omega_{td}$ represents obtained top end drive speed being an independent variable, $T_{ref}$ represents commanded top end drive torque being an independent variable, $\tau_d$ represents speed controller time delay, and s represents Laplace transform operator.

The down hole speed $\omega_{dh}$ is represented, in the spectral or frequency domain, by summing the multiplication result of the $M_{11}(s)$ transfer matrix component and the obtained top end drive speed $\omega_{td}$ and the multiplication result of the $M_{12}(s)$ transfer matrix component, the commanded top end drive torque $T_{ref}$ and the speed controller time delay function $e^{-s\tau_d}$.

The down hole torque $T_{dh}$ is represented, in the spectral or frequency domain, by summing the multiplication result of the $M_{21}(s)$ transfer matrix component and the obtained top end drive speed $\omega_{td}$ and the multiplication result of the $M_{22}$ transfer matrix component and the commanded top end drive torque $T_{ref}$ and speed controller time delay function $e^{-s\tau_d}$.

It is noted that, if applicable, the speed controller time delay includes the delay of a variable frequency drive (VFD) for controlling an AC electric motor driving the rotary table of the borehole drilling equipment. In practice such delays are in the order of magnitude of 10-30 msec.

As can be seen from expression (1) above, the calculation of the down hole speed and/or down hole torque, i.e. the dependent variables, in the method disclosed, is independent of the actual speed controller settings and depends only on the commanded top end drive torque set point $T_{ref}$ and the measured top end drive speed $\omega_{td}$, being the independent variables.

As the method can be performed while drilling commences, the speed controller can be automatically, essentially instantaneously, adapted and tuned to the relevant operational parameters of the borehole drilling equipment, among others for mitigating the impact of torsional vibrations and resonance in the drill string, by damping mechanical energy originating from the bottom hole assembly, and the occurrence and impact of stick-slip operation and oscillations.

Modelling of borehole drilling equipment dynamics constitutes the basis for system analysis and control. A valid dynamic model is a model that may generate essential outputs from obtainable, i.e. measured, inputs and estimates outputs therefrom with an acceptable accuracy. Existing drilling models can be generally classified as lumped parameter models, by which the drill string is regarded as a mass-spring-damper system; distributed parameter models, in which the drill string is considered as a beam subject to axial and/or torsional efforts; finite element models and transmission line models, in which a drill string is modelled by a plurality of fractions, each consisting of four parameters and two states, i.e. local speed and torque.

In a further example of the method, the two-port spectral domain transfer matrix computational model of the borehole drilling equipment comprises a two-port spectral domain transfer matrix, composed of a single or composite symmetrical two-port spectral domain transmission line equivalent drill string computational model including drill string inertia, stiffness and damping properties of the drill string in the borehole, bottom hole assembly inertia and top end drive inertia. The transfer matrix components of such a computational model are itself transfer functions in the spectral domain, i.e. transfer matrix transfer function components, as described in connection with equation (1) above.

With reference to the Background section above, the relevant mechanical and string geometry operational parameters, for calculating the transfer matrix components may be obtained manually and/or digitally under operator control from a spread-sheet or table or the like. In a more sophisticated implementation, the method can be performed completely automatically and autonomously, while drilling commences, without the intervention of an operator or other skilled personnel, by acquiring the relevant mechanical and string geometry operational parameters from applying the teachings of the International Patent Application WO2014/098598, filed in the name of applicant.

The two-port spectral domain transmission line equivalent of the drill string is based on the assumption that the dynamic drill string properties, i.e. drill string inertia, borehole wall damping, stiffness and material damping, do not alter along the length of the drill string. However, in practice, as discussed in the Background section above, when drilling progresses, the string geometry and mechanical properties of the tubulars of the drill string may change. Friction experienced by the drill string, such as by mechanical contact of the drill string with the inner wall of the borehole, may likewise change during operation. In such a case, the drill string may be modelled by a composite transfer matrix comprised by a matrix multiplication of a cascade of two-port transfer matrices of the respective sections of the drill string, each of which may be regarded uniform over its length as to its dynamical properties. The matrix components of each transfer matrix than reflect the particular dynamic properties of a respective section or length.

Information about the deviation or the angle of the borehole affecting the friction experienced by the drill string, may be obtained from down hole directional sensors and transmitters. As the geometric direction of the drill bit changes slowly in time, the information of such directional sensors may be reliably transmitted up the drill pipe with a relatively low transmission bit rate.

For presentation or visualization purposes, i.e. to provide a driller or drilling supervisor a near real time overview of the dynamic behaviour of the down hole part of the borehole drilling equipment, in an example of the method, at least one of the down hole speed and down hole torque are provided, by the computer, for a plurality of different positions along the drill string length or borehole by calculating, for each position, impulse response functions of the modified transfer matrix transfer function components, and by processing in a causal convolution operation from each of the calculated impulse response functions for a respective position and the obtained rotational top end drive speed and top end drive torque the at least one of the down hole speed and down hole torque at a respective position.

The positions are each time referred to a set fixed point of the borehole drilling equipment, such as the plane of the earth surface in which a borehole is drilled or another fixed reference position, such as the top end of the drill string. The impulse response functions for a particular position may be calculated in advance, i.e. in a first processing step, while the respective convolution operations are performed in a second processing step once the top end drive speed and top end drive torques are obtained. The down hole speed and/or down hole torque for the plurality of positions may be presented graphically, while drilling, at a display device in a spatial diagram as a function of time and position, in particular in a speed wave pattern or torque wave pattern diagram.

The method, or parts thereof, may be performed by computer or processing equipment located at a drilling site and/or by computer or computer system separate and remote from the borehole drilling equipment.

In a second aspect there is provided a device for estimating at least one of down hole speed and down hole torque of borehole drilling equipment for drilling a borehole in an earth formation. The borehole drilling equipment comprising a rotational drive system, a drill string having a bottom hole assembly comprising a drill bit and a top end coupled to the rotational drive system, and a speed controller arranged for controlling rotational top end drive speed by commanding a top end drive torque.

The device comprising a computer controlled drilling operation observer system arranged for:
  obtaining transfer matrix components of a two-port spectral domain transfer matrix computational model of the borehole drilling equipment, which computational model includes damping properties of the borehole drilling equipment, and wherein the down hole speed and down hole torque are dependent variables and the rotational top end drive speed and top end drive torque are independent variables;
  obtaining, while drilling, the rotational top end drive speed and top end drive torque, and
  calculating, from the obtained transfer matrix components, the top end drive speed and the top end drive torque at least one of the down hole speed and down hole torque of the borehole drilling equipment,
  wherein the calculating comprises:
  reducing spectral bandwidth of the calculation, the reduced bandwidth being selected to include a limited number of higher order spectral modes in the calculation,
  applying, in the spectral domain, a time delay term to the calculation, the time delay term being selected to enable a causal time domain solution, and
  calculating at least one of the down hole speed and down hole torque of the borehole drilling equipment from applying the reduced bandwidth and added time delay term.

In further embodiments the device is configured such that the computer controlled drilling operation observer system is arranged for estimating at least one of the down hole speed and down hole torque in accordance with the method of any of the examples disclosed above.

In another embodiment the device is operatively connected to or incorporated in the speed controller for directly obtaining the top end drive speed and top end drive torque.

In a third aspect borehole drilling equipment for drilling a borehole in an earth formation is provided, the borehole drilling equipment comprising a rotational drive system, a drill string having a bottom hole assembly comprising a drill bit and a top end coupled to the rotational drive system, a speed controller arranged for providing a commanded torque to control, i.e. alter the rotational drive speed of the top end, and a device for estimating at least one of down hole speed and down hole torque of the borehole drilling equipment in accordance with any of the examples disclosed above.

In a fourth aspect there is provided a computer program product, storing computer program code on a medium that can be read by a computer, which computer program code is arranged to carry out the method according to at least one of the above disclosed examples when the computer is operatively connected to borehole drilling equipment and the program code is executed by the computer.

The computer program product may include a machine-readable medium having stored thereon computer code instructions which may be used to program a computer (or other electronic devices) to perform a method according to the present disclosure.

The machine-readable medium may include, but is not limited to, non-transitory media such as optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions. Moreover, the computer program product may also be materialized by a downloadable computer program product signal, wherein the program may be transferred from a remote computer (e.g. a server) to a requesting computer (e.g. a client) by way of data signals embodied in a carrier wave or other propagation medium via a communication link (e.g. a modem or network connection). Accordingly, a carrier wave shall be regarded as comprising a machine-readable medium.

The above-mentioned and other features and advantages of the present disclosure will be best understood from the following detailed description referring to the attached drawings. In the drawings, like reference numerals denote identical parts or parts performing an identical or comparable function or operation.

Although the examples presented refer to specific computer software using MATLAB™ for computing the transfer matrix components of a selected computation model and their time-domain equivalents and impulse response functions, spectral domain transformations and inverse or spectral to time domain transformations, matrix manipulations, convolution operations and filter operations, the method, device, borehole drilling equipment and computer program product disclosed in the summary part of the present application are not to be construed as limited to this type of computer software program. To the contrary, the present disclosure may be applied with any commercially available computer program for computing spectral domain transformations and inverse transformations of transfer functions and impulse response functions of a dynamic system, matrix manipulations, convolution operations and filter operations, as well as proprietary software programs written, for example, in C, C+ or C++.

DETAILED DESCRIPTION

Figure 1:
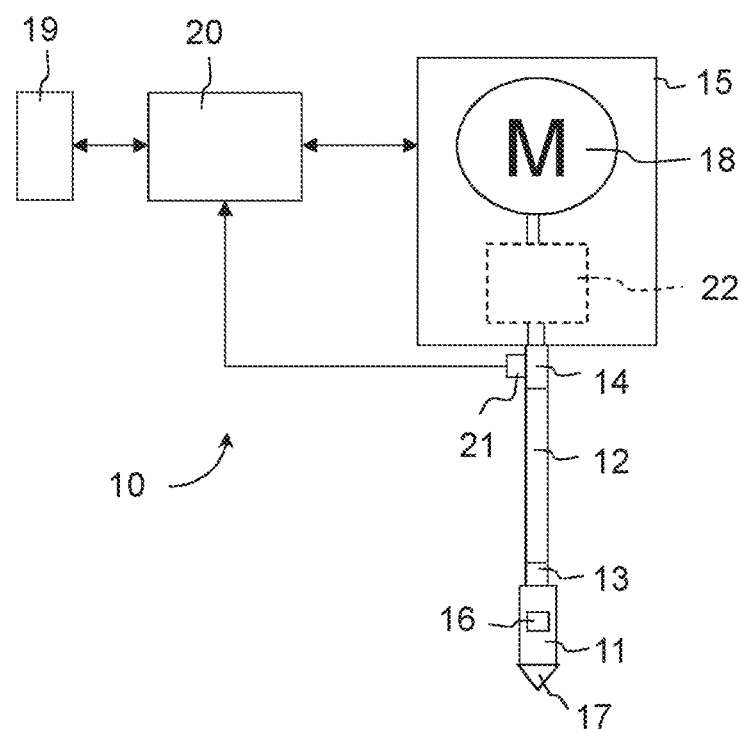
FIG. 1 is a very schematic representation of prior art borehole drilling equipment for drilling a borehole in an earth formation.

FIG. 1 shows, in a very schematic manner, a typical borehole drilling equipment 10 of a drilling rig for drilling a borehole in an earth formation. A cutting tool or drill bit 17 connects to a bottom hole assembly, BHA, 11 at a bottom end 13 of a drill string 12. At a top end 14 thereof, the drill string 12 is coupled to a rotational drive system 15, also called top drive or rotary table, which, in turn, is fixed to the surface of an earth formation in which a borehole is to be drilled by a derrick or a chassis of a drilling rig or may be mounted at a ship or the like (not shown).

The drill string 12 comprises lengths of hollow tubulars or drill pipes, threaded together end by end. A typical drill string is several kilometres long, such as 0-10 km, and the drill pipe may have an outer diameter of about 100-300 mm and a wall thickness of about 10-50 mm. The BHA 11 consists of heavier pipes that may have an outer diameter of about 250-500 mm and a wall thickness of about 100 mm, for example. The length of the BHA is typically in the range of 100-300 m. The drill string 12 is very slender compared to its length.

Although not shown, in an actual drilling operation, drilling fluid is pumped through the drill pipes of the drill string 12 towards the drill bit 17 for cooling and lubrication of the drill bit 17. Cuttings from the drilling operation are returned back up to the surface by the drilling fluid flowing through an annulus formed between the outer circumference of the drill string 12 and the borehole (not shown).

The bottom hole assembly 11 comprises several sensors and transmitters 16 and a directional tool (not shown) for directing the bottom hole assembly 11 to drill a borehole in a certain direction in the earth formation, such as vertical, horizontal or deviated at an angle and, of course, combinations thereof.

Drilling data and information are displayed at a console 19 comprising a display or other data output device (not shown) and an input device such as a keyboard, touch screen and the like (not shown) by which, through an intermediate speed controller 20, a driller may control rotational speed of the drive system 15 by inputting tuning parameters for the speed controller 20 and/or setting a torque limit for the drive system 15, for controlling the rotational speed of the drill bit 17.

The drive system 15 comprises a rotary drive system motor 18 to rotate the drill string 12, the BHA 11 and thereby the drill bit 17. Between the drive system motor 18 and the drill string 12 optionally a gearbox 22 may connect, having a particular gear reduction or a range of gear reductions.

Nowadays the drive system motor 18 generally is an electric motor, for example an 800 kW induction motor powered by a power converter. However, the present disclosure is equally applicable to a synchronous machine, a brushed DC machine, diesel engine, a hydraulic motor, or the like. The rotational speed of the drill string 12 may be measured at its top end 14 by a speed indicator or speed sensor 21, for example a speed sensor at the fast rotating motor shaft, the measurement signal of which is input to the speed controller 20. However, in the case of an electric drive system motor, the top end drive speed of the drill string may be obtained, for or with the speed controller 20, in a sensorless manner from the voltage and current supplied to the electric drive system motor 18, for example.

In use, at its top end 14, the drill string 12 can be pulled upwards by hoisting machinery, also called draw-works (not shown). On the bottom end 13, when on-bottom, the BHA 11 is resting at or touches the earth formation by the drill bit 17. This contrary to an off-bottom BHA 11 position, in which the drill bit 17 does not touch the earth formation at the bottom of the borehole. The slender drill pipes of the drill string 12 are constantly in tension, while the thick-walled lower part of the BHA 11 is partly in compression. The tension in the drill pipes avoids buckling of the drill pipe section. The torsional rigidity of the drill pipe section is, however, relatively small due to its slender construction.

In practice, several types of speed controllers 20 have been developed and used, the control operation of which complies to a well-known PI controller, operable for providing a type of proportional action, P, and a type of integral action, I, or as PII controller, having a double integral action, for example. In the case of an electric drive system motor 18, for example, the speed controller 20 may be arranged to operate on a feedback from any or all of measuring variables such as the drive motor current, the rotational speed of the drive motor, and fluctuations in the drive motor current and rotational speed. This, for example, to control the energy flow in the drive system 15 by controlling any or both of these variables and to measure the rotational speed exerted by the drive motor 18 at the top end 14 of the drill string 12.

The drive system 15 may operate in different modes, such as a so-called spinning mode and make-up mode, the present disclosure is primarily but not exclusively directed to the drill-mode, during which the driller aims to effectively grind or cut away material from an earth formation or geological formation by pushing and turning the drill bit 17 and flushing the borehole with drilling fluid or mud.

The dynamic system comprised by the top drive, drill string and bottom hole assembly, can be represented by an or a combination of different model representations, among which, a state-space model, an equivalent electrical circuit model, an equivalent mechanical torsional spring-inertia model, a segmented model, a continuous-time model, a discrete-time model, a spectral or frequency domain model, and wave propagation models, such as mechanical and electrical type transmission line models.

Figure 2:
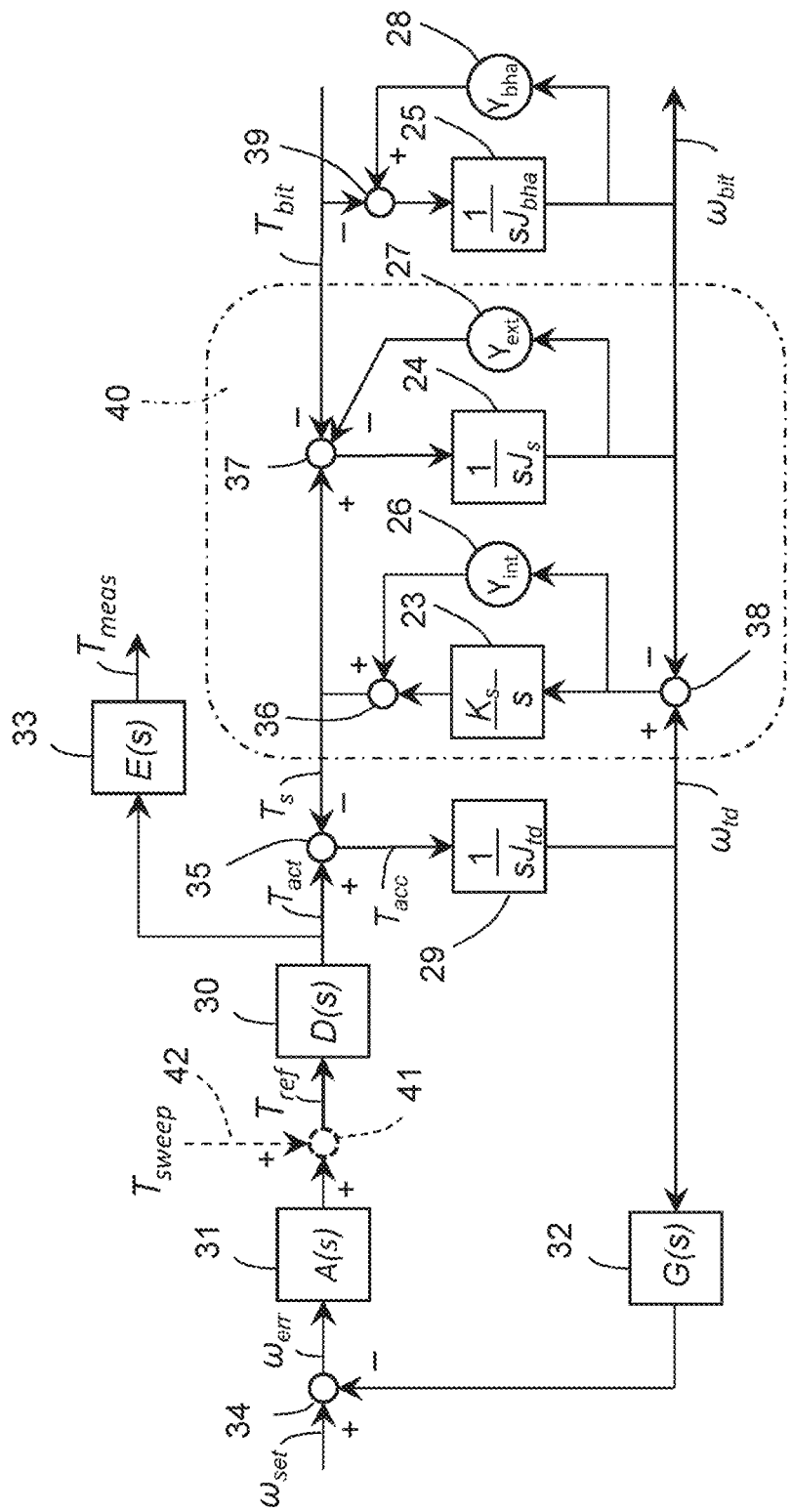
FIG. 2 shows a system model in the spectral domain of the borehole drilling equipment shown in FIG. 1, with a lumped drill string model.

Referring to FIG. 2, for the purpose of explaining the present disclosure, there is shown a simplified computational dynamic model representation of the borehole drilling equipment 10 of FIG. 1 in the spectral domain. The spectral domain is represented by the complex argument or operator s, following the well-known Laplace transform theory.

Reference numerals 34, 35, 36, 37, 38 and 39 in FIG. 2 denote summation operations, i.e. represented by small circles, having inputs, indicated by arrows pointing towards the circle, and an output, indicated by an arrow pointing away from the circle. The value at the output of a respective adder is the sum of the values at its inputs taken into to account the respective sign, i.e. plus or minus, indicated at a particular input in FIG. 2.

The drill string 12 is modelled in accordance with a so-called 'lumped string model'. In such a lumped string model, the drill string 12 as a whole, i.e. from its top end 14 to its bottom end 13, is simplified by a single torsional spring, experiencing a damping action caused by an internal and an external friction, operating along the drill string 12. Internal friction, among others, is caused by deformation losses inside the steel of the pipes of the drill string and is proportional to the wind-up/down speed of the drill string. Drilling fluid or drilling mud that is pumped down towards the BHA 11, for lubrication purposes, and cuttings from the drill bit 17 that are circulated back up the annulus, i.e. the space between the outer circumference of the drill string 12 and the borehole wall, to the earth surface, are also a cause of friction due to the speed difference of the drill string and the mud. All such drilling fluid or mud related friction forces are considered external friction.

In the spectral domain model of FIG. 2, the drill string 12 is represented by its transfer function 40, and is assumed to have a torsion stiffness $K_s$ [Nm/rad], string inertia $J_s$ [kgm$^2$], internal friction $Y_{int}$ [Nms/rad] and external friction $Y_{ext}$ [Nms/rad]. In the spectral domain, the torsion action 23 of the drill string 12 is modeled by its torsion stiffness $K_s$ and the Laplace transform operation 1/s, i.e. $K_s/s$. The inertia action 24 is modeled by the reciprocal or inverse of the string inertia $J_s$ and the Laplace transform operation 1/s, i.e. $1/(sJ_s)$. The internal and external friction actions $Y_{int}$, $Y_{ext}$ operating along the drill string 12 are represented by elements 26, 27, respectively, together with their summation sign at a respective input of the summation operations 36, 37, respectively.

The BHA 11 and drill bit 17 may be represented by a concentrated inertia $J_{bha}$ [kgm$^2$] and concentrated friction $Y_{bha}$ [Nms/rad] at the bottom end 13 of the drill string 12.

In the spectral domain, the concentrated inertia action 25 is represented by the reciprocal or inverse of $J_{bha}$ and the Laplace transform operation 1/s, i.e. $1/(sJ_{bha})$. The concentrated friction action $Y_{bha}$ is represented by element 28, together with its summation sign at a respective input of the summation operation 39.

The rotational drive system 15 is represented by an inertia $J_{td}$ [kgm$^2$] and its action is modelled by the reciprocal or inverse of the inertia $J_{td}$ and the Laplace transform operation 1/s, i.e. $1/(sJ_{td})$, represented by block 29.

The rotational drive system 15 in combination with a variable frequency drive (VFD), if applicable, acting as a source of torque with high bandwidth is condensed in a transfer function D(s), represented by reference numeral 30. Reference numeral 31 represents a speed-torque transfer function A(s) of the speed controller 20. A speed filter 32 having transfer function G(s) may be internally present in or externally connect to an input of the speed controller 20, represented by summing operation 34, for inputting the measurement signal of the speed indicator or speed sensor 21, for example, measuring the top end drive speed $\omega_{td}$ [rad/s]. Block 33 represents a torque filter having transfer function E(s) that may be present in the speed controller 20.

In the model of FIG. 2, $\omega_{set}$ [rad/s] represents the driller's reference speed, i.e. the rotational speed set by the driller at the input of the speed controller 20. The signal $\omega_{err}$ represents the difference between the speed signal $\omega_{td}$ representative of the actual rotational speed at the top end 14 of the drill string 12, and the reference or set rotational speed signal $\omega_{set}$ and is formed by the summation operation 34, i.e. $\omega_{err}=\omega_{set}-\omega_{td}$, and is input to transfer function A(s) 31.

The speed controller 20 operates, while drilling, to generate a commanded torque signal $T_{ref}$ [Nm] for controlling the drive system motor 18, represented by the transfer function D(s) 30. The actual torque provided by the drive system 15, i.e. at the output of the transfer function D(s) in the computational model of FIG. 2, is termed $T_{act}$ [Nm]. $T_{meas}$ represents the actual torque $T_{act}$ as indicated by the speed controller 20 through the filter transfer function E(s) of the torque filter 33, for example.

The accumulated torque $T_{acc}$ [Nm] experienced by the drive system 15, i.e. block 29 in the model of FIG. 2, is represented by a difference between the torque $T_{act}$ applied by the drive system motor 18 and the actual load torque $T_s$ [Nm] at the top end 14 of the drill string 12, formed by the summation operation 35, i.e. $T_{acc}=T_{act}-T_s$. The load torque operating at the drill bit 17 is represented by $T_{bit}$ [Nm] and the rotational speed of the drill bit, i.e. the BHA 11, is expressed by $\omega_{bit}$ [rad/s].

It is noted that in the system model shown in FIG. 2, the drill string 12 is represented by a two-port transfer function 40 in the spectral domain, the input variables of which are the bit torque $T_{bit}$ and the top end drive speed $\omega_{td}$, and the output variables of which are the load torque $T_s$ and the rotational bit speed $\omega_{bit}$. It is this choice of input and output parameters that explain the choice of the signs at the respective inputs of the summation operations 35, 37 and 38, as indicated.

In the present description and claims a generalized two-port transfer matrix notation is used, in which the bit torque $T_{bit}$ and the bit speed $\omega_{bit}$ at the downhole side form the dependent variables and the load torque $T_s$ and the top end drive speed $\omega_{td}$ at the top end side form the independent variables.

The lumped string model may be further simplified by replacing the string inertia $J_s$ by the concentrated inertia $J_{bha}$ and neglecting the concentrated friction $Y_{bha}$.

In use, at its top end 14, the drill string 12 can be pulled upwards by hoisting machinery, also called draw-works (not shown). On the bottom end 13, when on-bottom, the BHA 11 is resting at or touches the earth formation by the drill bit 17. This contrary to an off-bottom BHA 11 position, in which the drill bit 17 does not touch the earth formation at the bottom of the borehole. It will be appreciated that in off-bottom operation the damping or concentrated friction $Y_{bha}$ will be less than when the drill bit touches the earth formation at the bottom of the borehole, which translates into a much higher damping term than when off-bottom.

The lumped string model does not take into account any travel time of torsional waves nor higher modes in the drill string. The transfer function 40 of the drill string 12 as a whole is, however, also representative of the transfer function of a fraction of the drill string. Accordingly, the drill string as whole may be represented in the spectral domain by cascading a plurality of two-port transfer functions, each representing a section or length of the drill string 12 from its top end 14 to its bottom end 13, as shown in FIG. 3.

Figure 3:
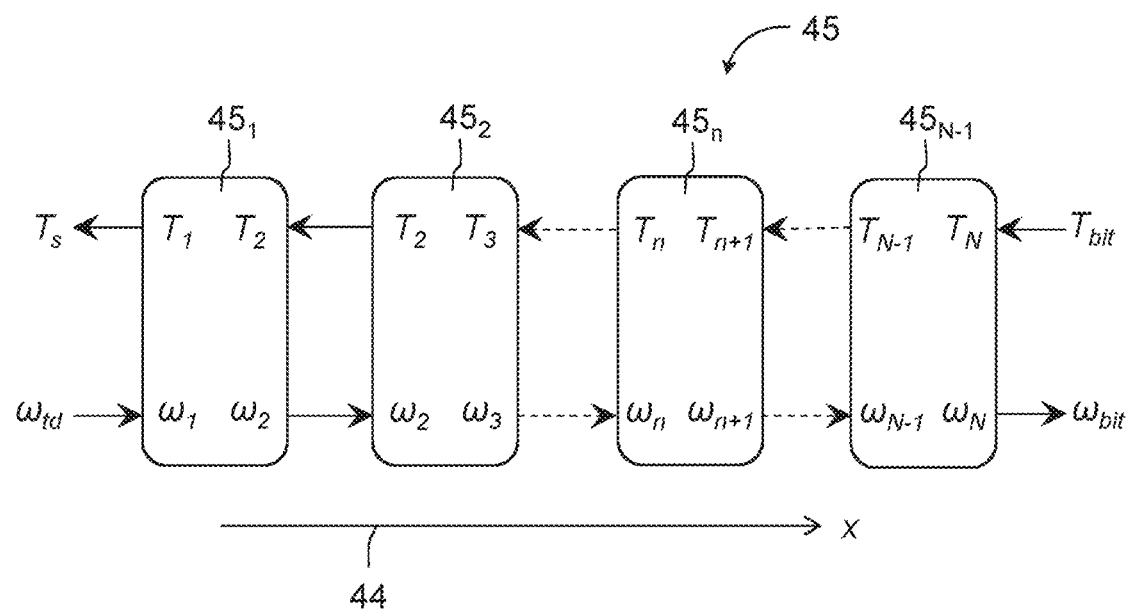
FIG. 3 shows a distributed drill string model in the spectral domain.

The distributed spectral domain string model 45 of FIG. 3 is comprised of N−1 two-port string transfer function sections or segments $45_1, 45_2, \ldots, 45_n, \ldots 45_{N-1}$, with N being an integer 2. The dependent variables of section n, i.e. torque $T_{n+1}$ and speed $\omega_{n+1}$ form the independent variables of the subsequent section n+1, i.e. torque $T_n$ and speed $\omega_n$, respectively, of this section n+1. The speed $\omega_1$ of the first section at the top end 14 of the drill string 12 is the top end drive speed $\omega_{td}$ and the torque $T_1$ of the first section is the actual load torque $T_s$ at the top end 14 of the drill string 12. The speed $\omega_N$ of the last section N at the bottom end 13 of the drill string 12 represents the rotational bit speed $\omega_{bit}$ while the torque $T_N$ operates at the BHA 11 and drill bit 17.

The length x along the drill string 12, i.e. the distance in the hole to be drilled, is schematically indicated by vector 44, running from the top end 14 to the bottom end 13 of the drill string 12. In a particular section n of the drill string, the respective fraction or length of the drill string 12 is assumed to have a torsion stiffness $K_{n,n+1}$, inertia $J_{n,n+1}$, internal friction $Y_{nint}$ and external friction $Y_{next}$.

All elements are assumed to be linear, which is a valid assumption for identifying the effective 'small-signal' friction. Coulomb friction, i.e. a steady torque only depending on the direction of movement, or 'Stribeck friction', a torque that decreases with increasing speed, effectively acting as a destabilizing negative small-signal friction, which is regarded to be the driving force in persisting stick-slip oscillations during unfavorable settings of the top drive controller, are not represented with the linear model of FIG. 2. When Coulomb friction is to be taken into account, same may be estimated as a fixed value of, generally, a few Nm/meter or a few kNm/kilometer drill string length and may be added to the external mud related friction.

Figure 4:
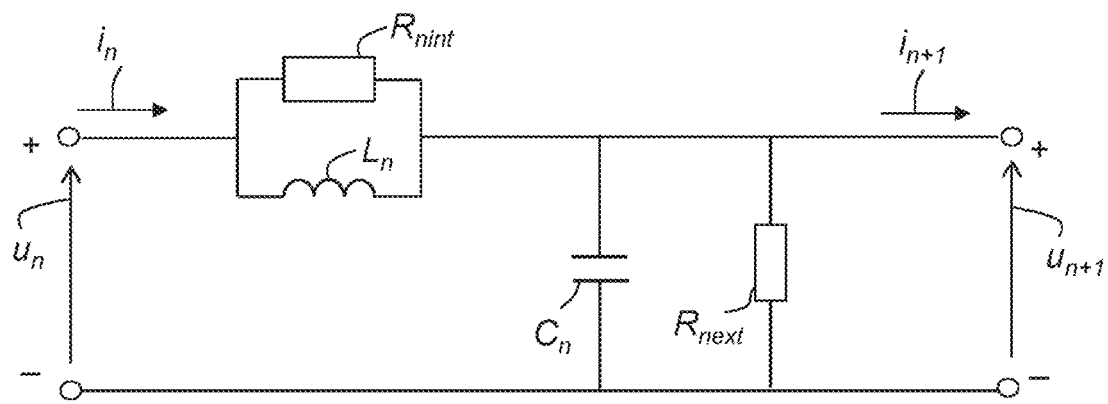
FIG. 4 shows an electrical equivalent circuit diagram of a string fraction of the distributed string model of FIG. 3.

As an alternative, the mechanically based computational model of the drill string of FIG. 3 may be represented by an electrical equivalent circuit diagram comprising electrical elements. FIG. 4 shows an electrical equivalent of a string fraction $45_n$ of the distributed string model of FIG. 3.

In the circuit diagram of FIG. 4 the respective fraction or length $45_n$ of the drill string is modeled by an inductor $L_n$ with an inductance value $L_n=1/K_{n,n+1}$ [H]. The inertia of the respective fraction or length of the drill string is modeled by a capacitor $C_n$ with a capacitance value $C_n=J_{n,n+1}$ [F]. Internal and external friction are represented by a resistor $R_{nint}$ having a resistance value $R_{nint}$ [Ω] and connected in parallel to the inductor $L_n$ and a resistor $R_{next}$ having a resistance value $R_{next}$ [Ω] and connect in parallel to the capacitor $C_n$, respectively. Note that admittance Y [A/V] and impedance or resistance R [V/A] are reciprocal, thus $R_{nint}=1/Y_{nint}$ and $R_{next}=1/Y_{next}$.

For the section n, current $i_n$ [A] and voltage $u_n$ [V] represent the independent variables torque $T_n$ and speed $\omega_n$, respectively, and current $i_{n+1}$ [A] and voltage $u_{n+1}$ [V] represent the dependent variables torque $T_{n+1}$ and speed $\omega_{n+1}$, respectively.

A realistic distributed string model may be built by using many dozens or even hundreds of fractions or lengths, each consisting of four parameters and two states (local speed and torque). Such a model resembles a ladder network used in transmission line models in electronics. The main difference, however, is that $R_{nint}$ being parallel to the inductor $L_n$. In the electrical world the copper resistance of the electrical conductors is in series with the per length inductance, not in parallel as presented here in the mechanical string model of FIG. 4. Another difference is the often ignored resistance $R_{next}$ in electrical transmission line models as the electrical isolation between the conductors is mostly very high and its effect may be neglected although in coaxial cable transmission line models dielectric losses caused by this electrical isolation are considered. However, torsional viscous friction exerted by the mud and bore hole wall friction is very substantial in borehole drilling and have to be incorporated in the mechanical string model and, accordingly, in the electrical equivalent thereof. Hence, the standard electrical equivalent circuit diagram of a transmission line needs to be modified to be applicable to model a drill string, as shown by the ladder-network transmission line model of FIG. 5.

Figure 5:
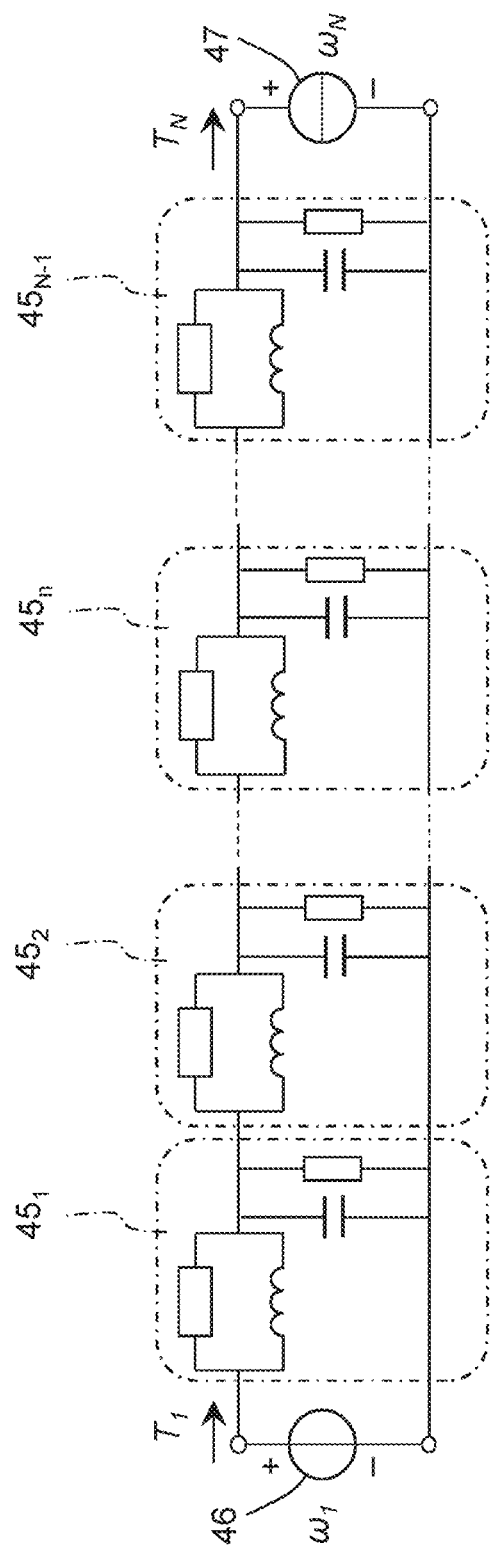
FIG. 5 shows an electrical equivalent transmission line circuit diagram applicable to model a drill string.

The equivalent electrical circuit diagram of FIG. 5 is a cascade of the electrical equivalent circuit diagrams in accordance with FIG. 4 of the respective string fractions $45_1$, $45_2$, ..., $45_n$, ... $45_{N-1}$ of the distributed string model of FIG. 3 and may be represented by a two-port transfer function in the spectral domain. Input current $i_1$ and input voltage $u_1$, represented by voltage source 46, are the independent variables $T_1$ and $\omega_1$, respectively, and output current $i_{N+1}$, represented by current source 47, and output voltage $u_{N+1}$ are the dependent variables $T_N$ and $\omega_N$ respectively.

A model such as shown in FIG. 5 would create a very large number of parameters to be identified. Fortunately the circuit in FIG. 5 may be written in the spectral or frequency domain for the limit case where N goes to infinity. It can be proven that for a drill string of length L and an infinite number N of string sections of length dx, such that $N=L/dx \to \infty$, a two-port transfer matrix in the spectral domain may be expressed as:

$$\begin{pmatrix} \omega_1 \\ T_1 \end{pmatrix} = \begin{bmatrix} \cosh(\gamma L) & Z_0 \sinh(\gamma L) \\ Y_0 \sinh(\gamma L) & \cosh(\gamma L) \end{bmatrix} \begin{pmatrix} \omega_N \\ T_N \end{pmatrix} \quad (2)$$

with transfer matrix properties:
γ=propagation coefficient [1/m]
$Y_0$=characteristic admittance [Nms/rad]
$Z_0=1/Y_0$=characteristic impedance [rad/Nms]
L=length of drill string [m]
$\cosh(\gamma L)=(e^{\gamma L}+e^{-\gamma L})/2$
$\sinh(\gamma L)=(e^{\gamma L}-e^{-\gamma L})/2$
$\omega_1$=rotational speed at top end of the drill string [rad/s]
$T_1$=torque at the top end of the drill string [Nm]
$\omega_N$=rotational speed at bottom end of the drill string [rad/s]
$T_N$=torque at the bottom end of the drill string [Nm]

The propagation coefficient and characteristic admittance or impedance can be derived from the mechanical properties of the drill string. Assume a drill string constructed of steel pipes having specific mass ρ [kg/m³], shear modulus G [N/m²], specific viscous wall damping κ [Ns/m⁴] and specific viscous damping originating in material hysteresis δ [Ns/m²]. With s being the Laplace transform operator, in the spectral domain applies:

$$\alpha = \rho \cdot s + \kappa \; [Ns/m^4] \quad (3)$$

$$\beta = (G/s) + \delta \; [Ns/m^2] \quad (4)$$

The dynamic properties of a length dx [m] of the drill string having a cross sectional polar moment $IP=\pi/32 \cdot (OD^4-ID^4)$ [m⁴], wherein OD=outer diameter [m] and ID=inner diameter [m] of a string pipe, can be expressed as:

$$\alpha \cdot IP \cdot dx = \rho \cdot s \cdot IP + \kappa \cdot IP \cdot dx \; [Nms/rad] \quad (5)$$

$$\beta \cdot (IP/dx) = (G \cdot IP)/(s \cdot dx) + \delta \cdot IP/dx \; [Nms/rad] \quad (6)$$

wherein: $\rho \cdot s \cdot IP \equiv$ inertia $J_{n,n+1}$, of the drill string section,
  $\kappa \cdot IP \cdot dx \equiv$ wall damping or external friction $Y_{next}$ of the drill string section,
  $(G \cdot IP)/(s \cdot dx) \equiv$ torsion stiffness $K_{n,n+1}$ of the drill string section, and
  $\delta \cdot IP/dx \equiv$ material damping or internal friction $Y_{nint}$ of the drill string section.

The resulting transfer matrix properties can be found from:

$$\text{propagation coefficient } \gamma = \sqrt{\frac{\alpha \cdot IP \cdot dx}{\beta \cdot IP/dx}} = \sqrt{\frac{\alpha}{\beta}} \cdot dx \quad (7)$$

$$\text{characteristic admittance } Y_0 = IP\sqrt{\alpha \cdot \beta} \quad (8)$$

$$\text{characteristic impedance } Z_0 = 1/Y_0 = 1/(IP\sqrt{\alpha \cdot \beta}) \quad (9)$$

Equation (2) can easily calculate, in the spectral domain, the behaviour of a uniform drill string of any length.

In case the mechanical properties of the drill string and/or the internal and external friction are not uniform along the length of the drill string, same by modelled by a composite transfer matrix comprised of a matrix multiplication of a cascade of two-port transfer matrices in the spectral domain, the transfer matrix components of each respective transfer matrix of this cascade than represents the mechanical properties and friction or damping of the respective part or length of the drill string that may be assumed uniform, in accordance with the above transfer matrix (2).

For example, assume the drill string 12 in FIG. 1 is modelled, in accordance with the electrical transmission line model described above, by a first section (a) extending from the top end 14 and a second section (b) terminating at the bottom end 13 in the borehole. Let $\omega_1$ and $T_1$ the rotational speed and torque operating at the drill string at the top end, $\omega_2$ and $T_2$ the rotational speed and torque operating at the interface of the first (a) and second sections (b) of the drill string, and $\omega_3$ and $T_3$ the rotational speed and torque operating at the end of the drill string. With $m_{a11}$, $m_{a12}$, $m_{a22}$, and $m_{a22}$ representing the transfer matrix components of the transfer matrix of section (a) of the drill string and $m_{b11}$, $m_{b12}$, $m_{b21}$, and $m_{b22}$ representing the transfer matrix components of the transfer matrix of section (b) of the drill string, in accordance with equation (2) above.

The two-port transfer matrix in the spectral domain for section (a) of the drill string may be expressed as:

$$\begin{pmatrix} \omega_1 \\ T_1 \end{pmatrix} = \begin{bmatrix} m_{a11} & m_{a12} \\ m_{a21} & m_{a22} \end{bmatrix} \begin{pmatrix} \omega_2 \\ T_2 \end{pmatrix} \quad (10)$$

The two-port transfer matrix in the spectral domain for section (b) of the drill string may be expressed as:

$$\begin{pmatrix} \omega_2 \\ T_2 \end{pmatrix} = \begin{bmatrix} m_{b11} & m_{b12} \\ m_{b21} & m_{b22} \end{bmatrix} \begin{pmatrix} \omega_3 \\ T_3 \end{pmatrix} \quad (11)$$

The two-port transfer matrix in the spectral domain of the drill string as whole is then found by substituting equation (11) in equation (10) resulting in:

$$\begin{pmatrix} \omega_1 \\ T_1 \end{pmatrix} = \begin{bmatrix} m_{a11} & m_{a12} \\ m_{a21} & m_{a22} \end{bmatrix} \cdot \begin{bmatrix} m_{b11} & m_{b12} \\ m_{b21} & m_{b22} \end{bmatrix} \begin{pmatrix} \omega_3 \\ T_3 \end{pmatrix} \quad (12)$$

Performing the matrix multiplication provides:

$$\begin{pmatrix} \omega_1 \\ T_1 \end{pmatrix} = \begin{bmatrix} m_{a11} \cdot m_{b11} + m_{a12} \cdot m_{b21} & m_{a11} \cdot m_{b12} + m_{a12} \cdot m_{b22} \\ m_{a21} \cdot m_{b11} + m_{a22} \cdot m_{b21} & m_{a21} \cdot m_{b12} + m_{a22} \cdot m_{b22} \end{bmatrix} \begin{pmatrix} \omega_3 \\ T_3 \end{pmatrix} \quad (13)$$

It will be appreciated that the transfer matrix for a drill string 12 composed of more than two sections having different mechanical properties and/or experiencing different frictions, may be calculated likewise.

A complete model of the borehole drilling equipment 10, i.e. speed controller 20, drive system 15, drill string 12 and BHA 11 and drill bit 17 can be derived by combining the two-port spectral domain transfer matrix representation (2) of the drill string 12 and respective two-port spectral domain transfer matrix representations of the BHA 11 and drill bit 17 on the one hand and of the speed controller 20 and drive system 15 on the other.

For the BHA 11 and drill bit 17, the two-port spectral domain transfer matrix including friction experienced by the BHA 11 and drill bit 17 seen as a whole, i.e. concentrated, may be expressed by:

$$\begin{pmatrix} \omega_N \\ T_N \end{pmatrix} = \begin{bmatrix} 1 & 0 \\ s\, J_{bha} + Y_{bha} & 1 \end{bmatrix} \begin{pmatrix} \omega_{bit} \\ T_{bit} \end{pmatrix} \quad (14)$$

wherein: $J_{bha}$=concentrated bottom hole assembly inertia
$Y_{bha}$=concentrated bottom hole assembly friction
$\omega_{bit}$=rotational bit speed
$\omega_N$=rotational speed at bottom end of drill string
$T_{bit}$=torque operating at the drill bit
$T_N$=torque operating at bottom end of drill string
s=Laplace transform operator.

The two-port spectral domain transfer matrix for the rotational speed and torque operating at the top end 14 of the drill string 12 by the drive system 15 including the time delay $\tau_d$ [s] caused by the speed controller 20 may be expressed by:

$$\begin{pmatrix} \omega_{td} \\ T_{ref} \end{pmatrix} = \begin{bmatrix} 1 & 0 \\ s\, J_{td} \cdot e^{s\tau_d} & e^{s\tau_d} \end{bmatrix} \begin{pmatrix} \omega_1 \\ T_1 \end{pmatrix} \quad (15)$$

wherein: $J_t$=top drive inertia
$\tau_d$=speed controller time delay
$\omega_{td}$=obtained rotational bit speed at top end of the drill string
$\omega_1$=rotational speed at top end of the drill string
$T_{ref}$=commanded top end drive torque
$T_1$=torque at top end of drill string
s=Laplace transform operator.

Substituting equations (2) and (14) into equation (15) provides the two-port spectral domain transfer matrix Mbh of the borehole drilling equipment 10 as a whole, i.e.:

$$\begin{pmatrix} \omega_{td} \\ T_{ref} \cdot e^{-s\tau_d} \end{pmatrix} = \begin{bmatrix} Mbh_{11}(s) & Mbh_{12}(s) \\ Mbh_{21}(s) & Mbh_{22}(s) \end{bmatrix} \begin{pmatrix} \omega_{bit} \\ T_{bit} \end{pmatrix} \quad (16)$$

wherein $Mbh_{11}(s)$, $Mbh_{12}(s)$, $Mbh_{21}(s)$ and $Mbh_{22}(s)$ are the spectral transfer matrix components of the transfer matrix Mbh of the complete borehole drilling equipment 10 as indicated above, with:

$$\begin{aligned} Mbh_{11}(s) &= \cosh(yL) + Z_0\,(s\, J_{bha} + Y_{bha})\,\sinh(yL) \\ Mbh_{12}(s) &= Z_0\,\sinh(yL) \\ Mbh_{21}(s) &= s\, J_{td}\,\{\cosh(yL) + Z_0(s\, J_{bha} + Y_{bha})\,\sinh(yL)\} - \\ &\quad \{Y_0\,\sin(yL) + (s\, J_{bha} + Y_{bha})\,\cosh(yL)\} \\ Mbh_{22}(s) &= s\, J_{td}\, Z_0\,\sinh(yL) + \cosh(yL). \end{aligned} \quad (17)$$

Applying the rules of matrix inversion to equation (16) results in:

$$\begin{pmatrix} \omega_{bit} \\ T_{bit} \end{pmatrix} = \begin{bmatrix} Mbh_{22}(s) & -Mbh_{12}(s) \\ -Mbh_{21}(s) & Mbh_{11}(s) \end{bmatrix} \begin{pmatrix} \omega_{td} \\ T_{ref} \cdot e^{-s\tau_d} \end{pmatrix} \quad (18)$$

since the determinant (Det) of the transfer matrix Mbh of the complete borehole drilling equipment equals 1, i.e. Det (Mbh)=$Mbh_{11}(s) \cdot Mbh_{22}(s) - Mbh_{12}(s) \cdot Mbh_{21}(s)$=1. In the notation of equation (18) the bit torque $T_{bit}$ and the bit speed $\omega_{bit}$ at the downhole side form the dependent variables and the load commanded top end drive torque $T_{ref}$ and the top end drive speed $\omega_{td}$ at the top end side form the independent variables.

Observe that the rotational speed $\omega_{bit}$ at the bottom end of the drill string and the torque $T_{bit}$ operating at the drill bit can be calculated, in the spectral domain, from equation (18) by applying matrix multiplication, such that:

$$\omega_{bit} = Mbh_{22}(s) \cdot \omega_{td} - Mbh_{12}(s) \cdot T_{ref} e^{-s\tau_d} \quad (19)$$

$$T_{bit} = -Mbh_{21}(s) \cdot \omega_{td} + Mbh_{11}(s) \cdot T_{ref} e^{-s\tau_d} \quad (20)$$

To ease and/or speed up the calculations, one may simplify equations (19) and (20) by, for example, assuming the concentrated friction $Y_{bha}$=0 and $Mbh_{11}(s)=Mbh_{22}(s)$.

The spectral transfer matrix components of spectral the transfer matrix Mbh of the complete borehole drilling equipment 10 as indicated above are each frequency dependent transfer functions. To simplify the further description, the spectral transfer matrix components are written as $Mbh_{11}$, $Mbh_{12}$, $Mbh_{21}$ and $Mbh_{22}$.

It has been observed that in practical systems, above a frequency threshold, due to the approximations and assumptions applied in accordance with equations (2)-(9), the requirement for matrix inversion, Det (Mbh)= $Mbh_{11} \cdot Mbh_{22} - Mbh_{12} \cdot Mbh_{21} = 1$ is no longer met. This has the effect of rising phases of the transfer matrix components $Mbh_{11}$, $Mbh_{12}$, $Mbh_{21}$, and $Mbh_{22}$ above this frequency threshold. Further, for higher frequencies, gains of the transfer matrix components rapidly increase due to the non-zero real part of the propagation coefficient $\gamma$ in the functions $\cos h(\gamma L) = (e^{\gamma L} + e^{-\gamma L})/2$ and $\sin h(\gamma L) = (e^{\gamma L} - e^{-\gamma L})/2$.

To compensate for these phenomena, the transfer matrix components $Mbh_{11}$, $Mbh_{12}$, $Mbh_{21}$ and $Mbh_{22}$ are modified by reducing the spectral bandwidth thereof such to include the fundamental mode and a limited number of higher order spectral modes of the transfer matrix components, and by adding, in the spectral domain, a time delay term to each of the transfer matrix components, the time delay being selected to enable a causal time domain solution.

Suppose that the transfer function of a bandwidth reduction filter, i.e. a low-pass band filter, in the spectral domain is F(s) and that a time delay TF [s] is added to enable a causal time domain solution. Than, in the spectral domain, from equations (18) and (19), the rotational speed $\omega_{bit}$ at the bottom end of the drill string and the torque $T_{bit}$ operating at the drill bit, applying the bandwidth reduction, i.e. the limitation or reduction of higher order spectral modes, and time delay operations, can be calculated from:

$$\omega_{bit} = \{Mbh_{22} \cdot \omega_{td} - Mbh_{12} \cdot T_{ref} \cdot e^{-s\tau_d}\} \cdot F(s) \cdot e^{-s\tau_F} \quad (21)$$

$$T_{bit} = \{-Mbh_{21} \cdot \omega_{td} + Mbh_{11} \cdot T_{ref} \cdot e^{-s\tau_d}\} \cdot F(s) \cdot e^{-s\tau_F} \quad (22)$$

In the time domain $\omega_{bit}$ and $T_{bit}$ may be calculated from the inverse Laplace transform of equations (21) and (22), respectively.

The bandwidth reduction may be obtained by any suitable filter function and can be based on, for example, at least one of the damping properties and length of the drill string, such to include in the calculation only higher order spectral modes having a spectral power density above a selected value and/or a maximum number of higher order spectral modes, such as 10 or preferably up to 20 or more preferably up to 30 spectral modes above the fundamental mode, for example.

As low-pass band filter function F(s) an $n^{th}$ order low-pass Bessel filter operation may be used, wherein $n \geq 4$, preferably $n \geq 10$, more preferably $n \geq 20$, and tapering. For the purpose of alleviating the calculation of time-domain equivalents, a gradually decreasing tapering or window function is preferred, such as but not limited to, a cosine, a confined Gaussian, a Welch and a Lanczos window function or similar.

Applying the filter function and delay multiplications in equations (21) and (22) above, with F(s) written as F, results in:

$$\omega_{bit} = (F \cdot e^{-s\tau_F} \cdot Mbh_{22}) \cdot \omega_{td} - (F \cdot e^{-s\tau_F} \cdot Mbh_{12}) \cdot T_{ref} \cdot e^{-s\tau_d} \quad (23)$$

$$T_{bit} = -(F \cdot e^{-s\tau_F} \cdot Mbh_{21}) \cdot \omega_{td} + (F \cdot e^{-s\tau_F} \cdot Mbh_{11}) \cdot T_{ref} \cdot e^{-s\tau_d} \quad (24)$$

and written in matrix notification in accordance with equation (18):

$$\begin{pmatrix} \omega_{bit} \\ T_{bit} \end{pmatrix} = \begin{bmatrix} Mb_{11} & Mb_{12} \\ Mb_{21} & Mb_{22} \end{bmatrix} \begin{pmatrix} \omega_{td} \\ T_{ref} \cdot e^{-s\tau_d} \end{pmatrix} \quad (25)$$

wherein $Mb_{11}$, $Mb_{12}$, $Mb_{21}$ and $Mb_{22}$ represent bandwidth limited and time delay term modified spectral transfer matrix components for the complete borehole drilling equipment including drill string inertia, borehole wall damping, stiffness and material damping, top end drive inertia, and bottom hole assembly inertia, in accordance with:

$$\begin{aligned} Mb_{11} &= F \cdot e^{-s\tau_F} \cdot Mbh_{22} \\ Mb_{12} &= -F \cdot e^{-s\tau_F} \cdot Mbh_{12} \\ Mb_{21} &= -F \cdot e^{-s\tau_F} \cdot Mbh_{21} \\ Mb_{22} &= F \cdot e^{-s\tau_F} \cdot Mbh_{11}. \end{aligned} \quad (26)$$

Equation (25) may be written in a generalized two-port spectral domain transfer matrix computational model for calculating down hole speed and/or down hole torque at any position x in the borehole or along the drill string, as schematically indicated by arrow 44 in FIG. 3, in accordance with:

$$\begin{pmatrix} \omega_{dh} \\ T_{dh} \end{pmatrix} = \begin{bmatrix} M_{11}(x) & M_{12}(x) \\ M_{21}(x) & M_{22}(x) \end{bmatrix} \begin{pmatrix} \omega_{td} \\ T_{ref} \cdot e^{-s\tau_d} \end{pmatrix} \quad (27)$$

wherein: $M_{11}(x)$, $M_{12}(x)$, $M_{21}(x)$ and $M_{22}(x)$ = bandwidth limited and time delay term modified spectral transfer matrix components at a particular position x along the length of the drill string,
$\omega_{dh}$ = down hole speed,
$T_{dh}$ = down hole torque,
$\omega_{td}$ = obtained top end drive speed,
$T_{ref}$ = commanded top end drive torque,
$\tau_d$ = speed controller time delay, and
s = Laplace transform operator.

Assuming a uniform mechanical composition of the drill string and uniform damping or friction properties along the drill string length, for a given position x [m] along the drill string or the borehole measured from a fixed reference position, i.e. the top end of the drill string, the respective modified transfer matrix components of equation (27) may be derived from equations (2-9), such that:

$$\begin{aligned} M_{11}(x) &= F \cdot e^{-s\tau_F} \cdot \{s \, J_{td} \, Z_0 \, \sinh(y \cdot x) + \cosh(y \cdot x)\} \\ M_{12}(x) &= F \cdot e^{-s\tau_F} \, Z_0 \, \sinh(y \cdot x) \\ M_{21}(x) &= -F \cdot e^{-s\tau_F} \cdot \{s \, J_{td} \, \cosh(y \cdot x) + Y_0 \, \sinh(y \cdot x)\} \\ M_{22}(x) &= F \cdot e^{-s\tau_F} \cdot \cosh(y \cdot x) \end{aligned} \quad (28)$$

In the event of a non-uniform drill string and/or non-uniform or varying internal and external friction along the length of the drill string, same by modelled by a composite transfer matrix as disclosed above with reference to equations (10-13).

Note that in equation (28) the modified spectral transfer matrix components are each spectral transfer functions and may be written in full notation as $M_{11}(x;s)$, $M_{12}(x;s)$, $M_{21}(x;s)$ and $M_{22}(x;s)$.

In the time-domain, any or both of the down hole speed and down hole torque are efficiently calculated in a convolution operation processing the obtained rotational top end drive speed and top end drive torque and impulse response functions of the modified spectral transfer matrix components $M_{11}$, $M_{12}$, $M_{21}$ and $M_{22}$ over a period of time including one round trip time in the drill string. That is back and forth the drill string length.

A convolution of two continuous functions g and h over a finite time range $[-t_0, t_0]$ is generally expressed by:

$$[g * h](t) = \int_{-t_0}^{t_0} g(u) \cdot h(t-u) \, du \quad (29)$$

and for discrete signals g' and h' over a number of samples n in the time domain over a finite time range $[-p_0, p_0]$ by:

$$[g' * h'](n) \equiv \sum_{-p_0}^{p_0} g'(v) \cdot h'(n-v) \quad (30)$$

The impulse response functions of the modified spectral transfer matrix components $M_{11}$, $M_{12}$, $M_{21}$ and $M_{22}$ are calculated from inverse spectral to time domain transformation and can be suitably synthesized from commercially available computer software and only need to span a length of time at least equal to a single round trip time in the drill string which, in practice, equals a few seconds.

Assume the impulse response functions of the modified spectral transfer matrix transfer function components $M_{11}(s)$, $M_{12}(s)$, $M_{21}(s)$ and $M_{22}(s)$ are expressed by $H_{11}(t)$, $H_{12}(t)$, $H_{21}(t)$ and $H_{22}(t)$, respectively. As the measured time varying top end drive speed $\omega_{td}(t)$ and the commanded top end drive torque $T_{ref}(t)$ are only known from the past, the time-varying down hole speed $\omega_{dh}(t)$ and/or down hole torque $T_{dh}(t)$ of the borehole drilling equipment are calculated by causal convolution operations, i.e. over a finite time range running from $[-2t_0, 0]$:

$$\omega_{dh}(t-t_0) = \quad (31)$$
$$\int_{-2t_0}^{0} \omega_{td}(u) \cdot H_{11}(t-u) \, du + \int_{-2t_0}^{0} T_{ref}(u-\tau_d) \cdot H_{12}(t-u) \, du$$

$$T_{dh}(t-t_0) = \quad (32)$$
$$\int_{-2t_0}^{0} \omega_{td}(u) \cdot H_{21}(t-u) \, du + \int_{-2t_0}^{0} T_{ref}(u-\tau_d) \cdot H_{22}(t-u) \, du$$

From equations (31) and (32) one can see that the total delay in the calculation amounts $t_0$, i.e. the calculated down hole speed and down hole torque are delayed over $t_0$, which is expressed as $\omega_{dh}(t-t_0)$ and $T_{dh}(t-t_0)$, respectively. The convolution operations (31) and (32), which are calculated in practice based on discrete signals, are computationally very efficient in that the range $[-2t_0, 0]$ may equal a period of time including at least one round trip time in the drill string, in particular a period of time being a fraction longer, say 10-20% longer, than one round trip time. Thus, wherein to minimal amounts a one way travel time in the drill string.

For calculating the bit speed and/or bit torque, synthesized impulse response functions of the modified spectral transfer matrix components $Mb_{11}$, $Mb_{12}$, $Mb_{21}$ and $Mb_{22}$ from equations (17) and (26) are to be applied, i.e. $Hb_{11}(t)$, $Hb_{12}(t)$, $Hb_{21}(t)$ and $Hb_{22}(t)$.

FIGS. 6a, 6b, 6c and 6d show examples of a the impulse response functions $Hb_{11}(t)$, $Hb_{12}(t)$, $Hb_2(t)$ and $Hb_{22}(t)$ including drill string inertia, borehole wall damping, stiffness, material damping, top end drive inertia, bottom hole assembly inertia, bit friction and assuming a uniform drill strength and uniform damping, computed from a drilling equipment simulation test system developed by applicant. This simulation test system comprises an electric drive motor, acting as top drive and controlled by a speed controller, and a controllable electric load, mechanically coupled to the drive motor, simulating the drill string, BHA and drill bit.

For verification purposes, the borehole drilling simulation test equipment has been operated while simulating a practical drilling operation with stick-slip and applying stick-slip mitigation control, showing the following properties:

| | |
|---|---|
| propagation coefficient $\gamma = 3.1404 \, 10^{-4}$ | [1/m] |
| characteristic admittance $Y_0 = 377.71$ | [Nms/rad] |
| characteristic impedance $Z_0 = 0.0026476$ | [rad/Nms] |
| top drive inertia $J_{td} = 1060$ | [kgm$^2$] |
| concentrated bottom hole inertia $J_{bha} = 105.5$ | [kgm$^2$] |
| concentrated friction $Y_{bha} = 4.03$ | [Nms/rad] |
| drill string length $L = 3804$ | [m] |
| specific external friction $\kappa = 398.2$ | [Ns/m$^4$] |
| specific internal friction $\delta = 2.757 \, 10^{-8}$ | [Ns/m$^2$] |

Calculations in accordance with the present disclosure have been performed applying a tapered 25$^{th}$ order Bessel filter function F having a low-pass bandwidth of 5 Hz and with an added time delay term $\tau_F$ of 2 seconds.

In FIGS. 6a, 6b, 6c and 6d, time $t-\tau_F$ [s] is plotted along the horizontal axis, i.e. the graphs 61-68 are depicted shifted over a time delay of 2 s.

In FIGS. 6a, 6b, 6c and 6d, the solid graphs 61, 62, 63, 64 show the impulse response functions over a period of time t calculated for the drill string represented by a four segment or section model, in accordance with the model shown in FIG. 2. The dashed graphs 65, 66, 67, 68 represents the impulse functions over a period of time t calculated for a single segment or section drill string model, as illustrated in FIG. 3.

Figure 6A:
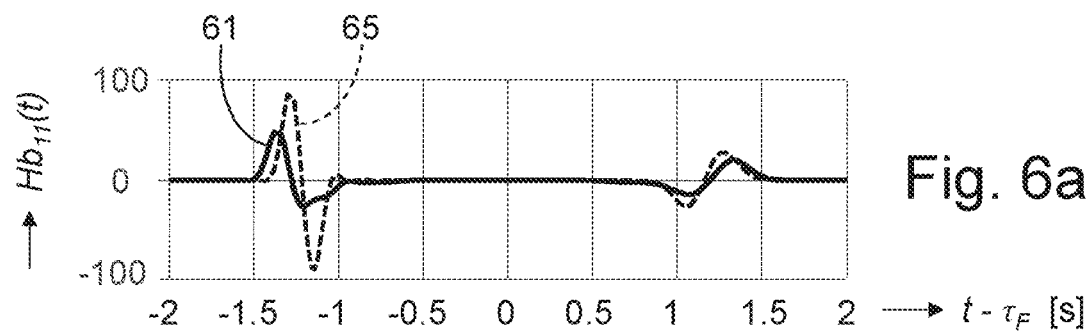
FIGS. 6a, 6b, 6c and 6d show graphs of impulse response functions calculated for a practical borehole drilling equipment simulated at a simulation test system of applicant, with the drill string represented by a single segment or section model and a four segment or section model, in accordance with the present disclosure.
Figure 6B:
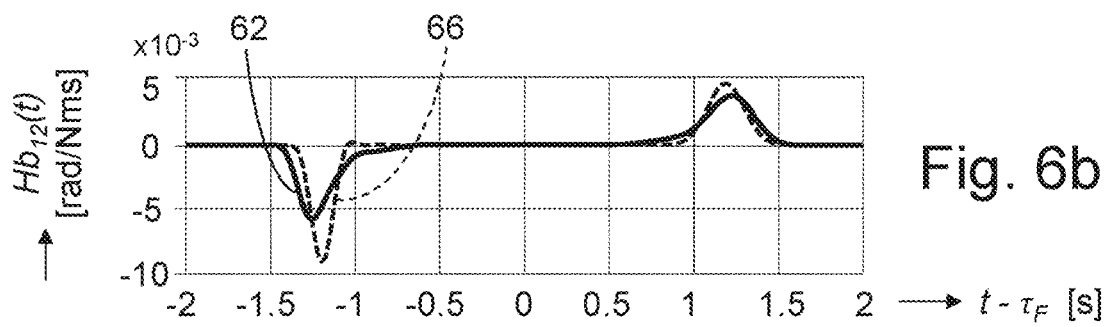
Figure 6C:
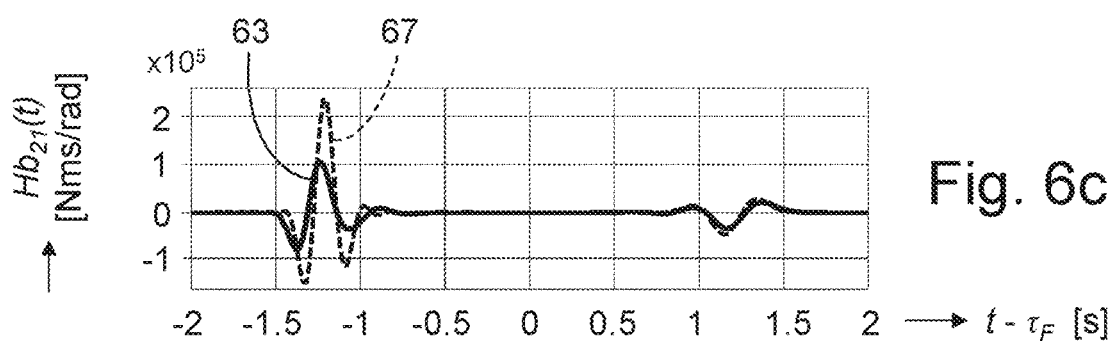
Figure 6D:
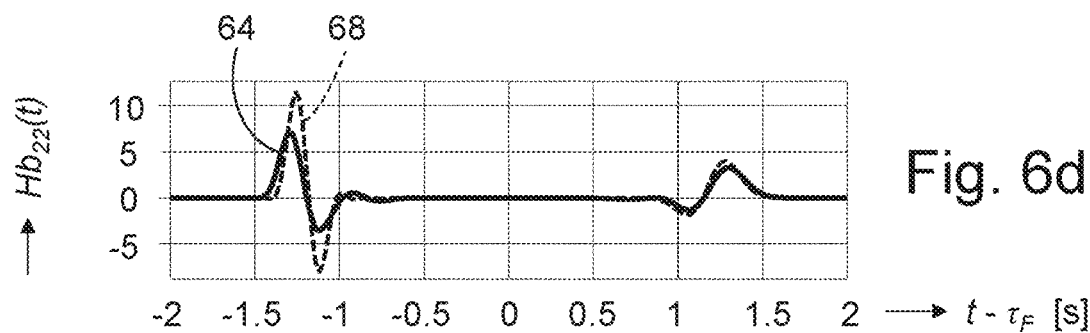

FIG. 6a shows the impulse response function $Hb_{11}(t)$, 61, 65, which is dimensionless, representing the contribution of the top end drive speed $\omega_{td}$ to the bit speed $\omega_{bit}$. FIG. 6b shows the impulse response function $Hb_{12}(t)$ [rad/Nms], 62, 66, representing the influence of the commanded top end drive torque $T_{ref}$ to the bit speed $\omega_{bit}$. FIG. 6c shows the impulse response function $Hb_{21}(t)$ [Nms/rad], 63, 67, illustrating the contribution of the top end drive speed $\omega_{td}$ at the bit torque $T_{bit}$. FIG. 6d shows the transfer of the commanded top end drive torque $T_{ref}$ to the bit torque $T_{bit}$ by the impulse response function $Hb_{22}(t)$, 64, 68, which is also dimensionless.

From the impulse response functions shown, it can be derived that the top end drive speed $\omega_{td}$ and the commanded top end drive torque $T_{ref}$ only contribute to the bit speed $\omega_{bit}$ and bit torque $T_{bit}$ in the limited time period from about −1.5 s to 1.5 s and that the impulse response functions are zero or essentially zero outside this time period. More particular, within the time period of −1.5 s to 1.5 s the impulse response functions are also partly zero or essentially zero, i.e. from about −1 to 1 s. Accordingly, for a relatively long uniform drill string, convolution operations need to be performed over a very limited range only.

Figure 7A:
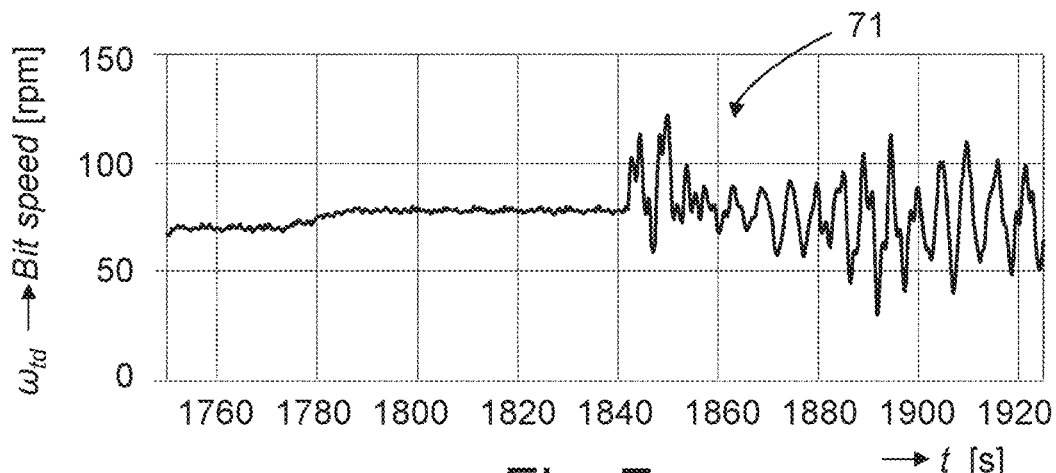
FIGS. 7a, 7b and 7c illustrate graphically, over a selected time period, the bit speed and the contributions to the bit speed calculated for the borehole drilling equipment corresponding to FIGS. 6a-6d, based on the four segment drill string impulse response functions and the obtained actual values of the top end drive speed and the commanded top end drive torque at the simulation test system.
Figure 7B:
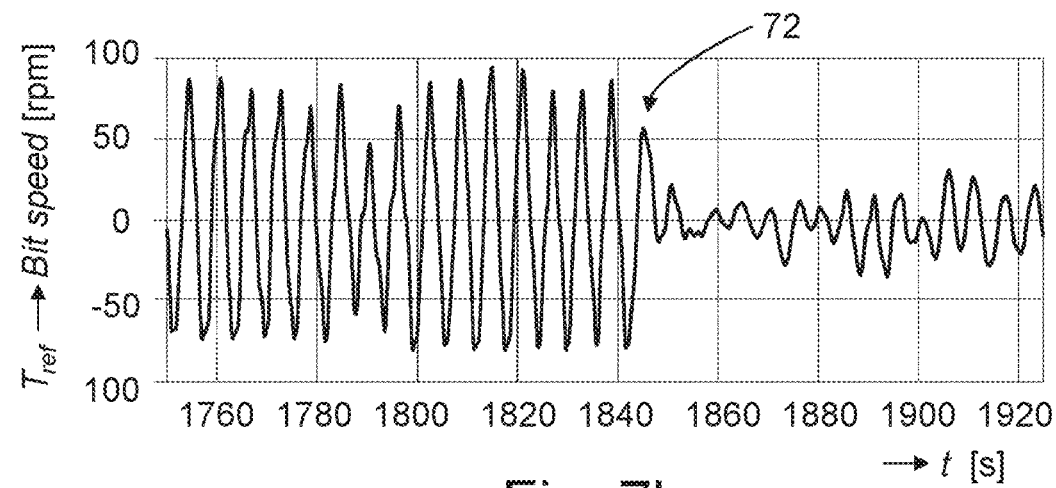
Figure 7C:
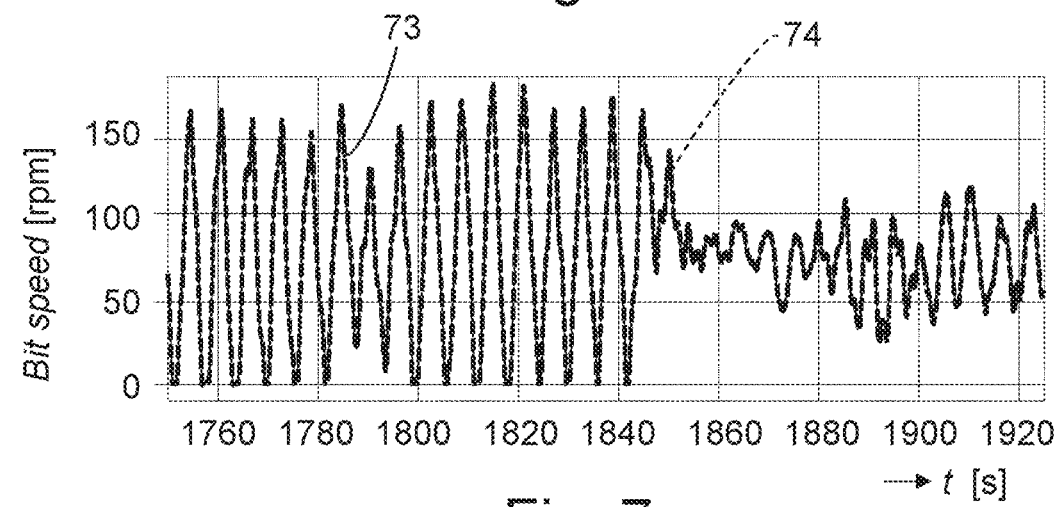

The solid line 73 in FIG. 7c illustrates graphically, over a selected time period t, the calculated bit speed $\omega_{bit}$ in revolutions per second [rpm], based on the four segment drill string impulse response functions in FIGS. 6a-6d and actual values of the top end drive speed $\omega_{td}$ and the commanded top end drive torque $T_{ref}$ measured over time from the simulated drilling operation performed by the borehole drilling simulation equipment mentioned above in connection with FIGS. 6a-6d. The dashed line 74 illustrates the actual measured bit speed at the simulation test equipment.

During the simulation, at time t=disclosure s form the start of the simulation, stick-slip mitigation control is applied, in accordance with the method and device disclosed in the International Patent Application WO2013/062409, filed in the name of applicant. In FIG. 7b, prior to t=disclosure s stick-slip occurs, and the speed of the drill bit fluctuates rapidly between zero and about 200 rpm. From the time of applying stick-slip mitigation control, the bit speed fluctuations rapidly decrease, as shown in FIG. 7b from time t=disclosure s.

Graph 71 in FIG. 7b shows the calculated contribution to the bit speed $\omega_{bit}$ by the top end drive speed $\omega_{td}$, and graph 72 in FIG. 7c shows how the commanded top end drive torque $T_{ref}$ contributes to the bit speed $\omega_{bit}$ over a period of time t, both based on the four segment impulse response functions shown in FIG. 6a-6d. Graph 73 is the sum of both graphs 71 and 72.

Figure 8:
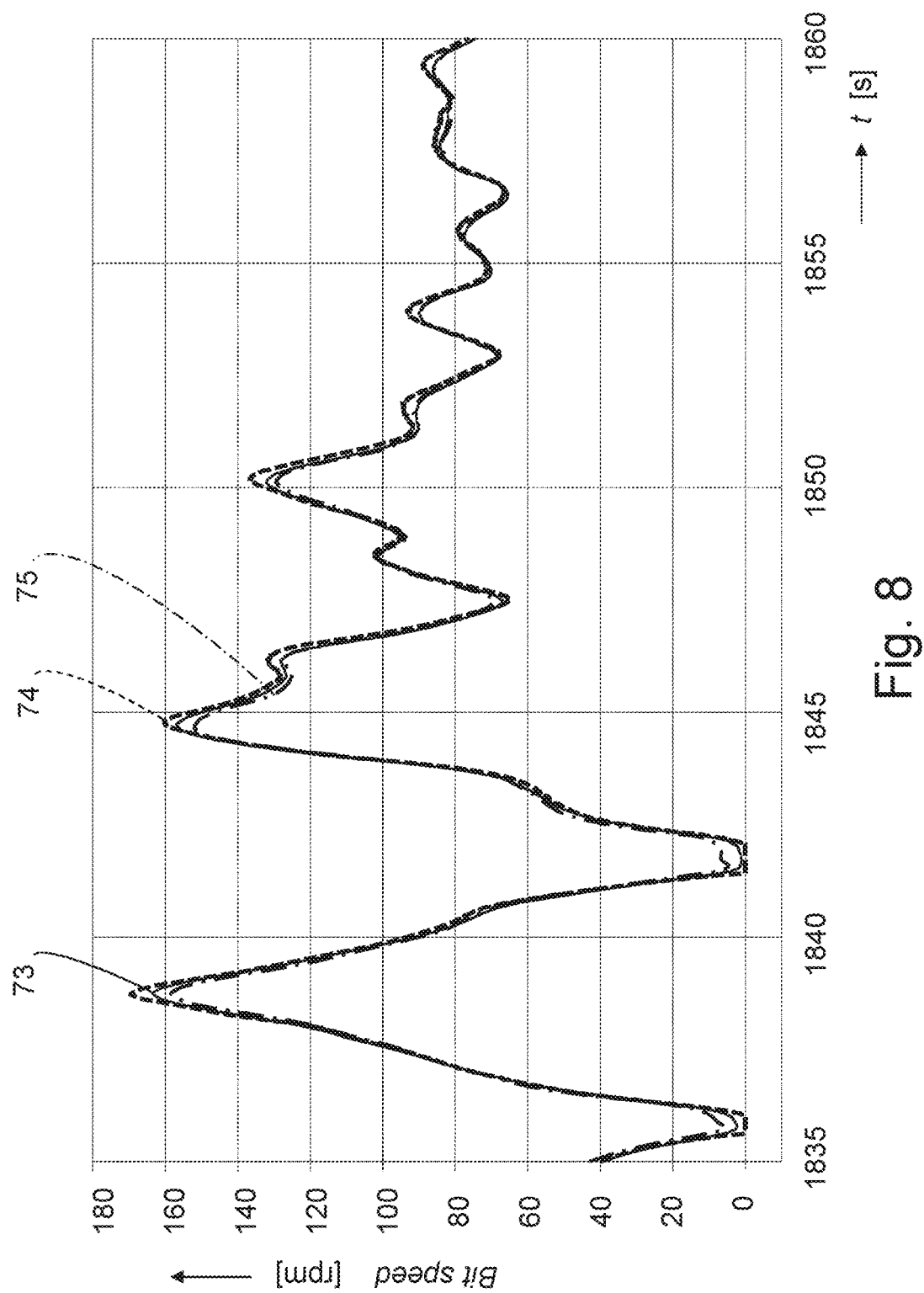
FIG. 8 illustrates graphically, on an enlarged time scale with respect to FIGS. 7a-7c, actual measured bit speed values and the bit speed calculated in accordance with the present disclosure from a four segment drill string model and a single segment model of the drill string for the borehole drilling equipment simulated at the simulation test system corresponding to FIGS. 6a-6d.

It is remarkably to note the accuracy of the calculated bit speed in accordance with the present disclosure and the measured values. FIG. 8 shows, to this end, an enlarged graphical presentation, illustrating the actual measured bit speed value, at the time interval directly on an enlarged tie scale, prior to and directly after applying stick-slip mitigation control at t=disclosure s. The dashed graph 74 represents the actual measured bit speed in the simulation and the solid line graph 73 represents the bit speed calculated in accordance with the present disclosure from a four segment drill string model. The dashed dotted graph 75 shows the bit speed calculated from a single segment model of the drill string, based on the drill string operation simulated as mentioned with reference to FIGS. 6a-6d.

Both the four segment and single segment drill string computational model provide the same trend in the bit speed over time, in accordance with the measured values from the simulation test system.

Figure 9A:
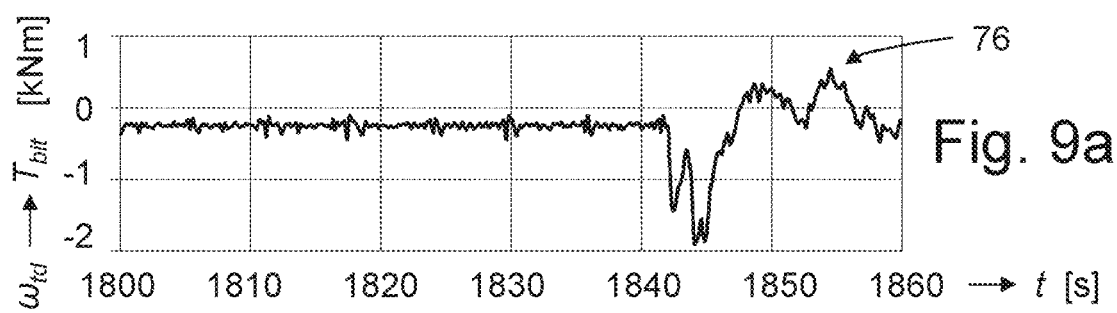
FIGS. 9a, 9b, 9c and 9d illustrate graphically, over a selected time period, the contributions to the bit torque calculated for the borehole drilling equipment based on the four drill string impulse response functions and the obtained actual values of the top end drive speed and the commanded top end drive torque, and the calculated and measured bit torque simulated at the test system corresponding to FIGS. 6a-6d.
Figure 9B:
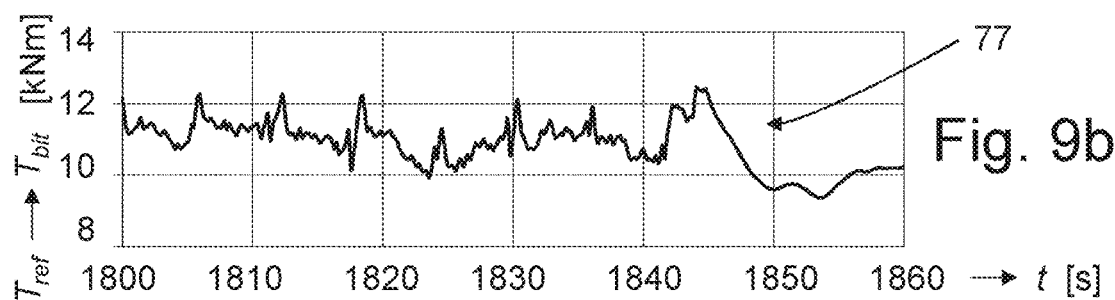
Figure 9C:
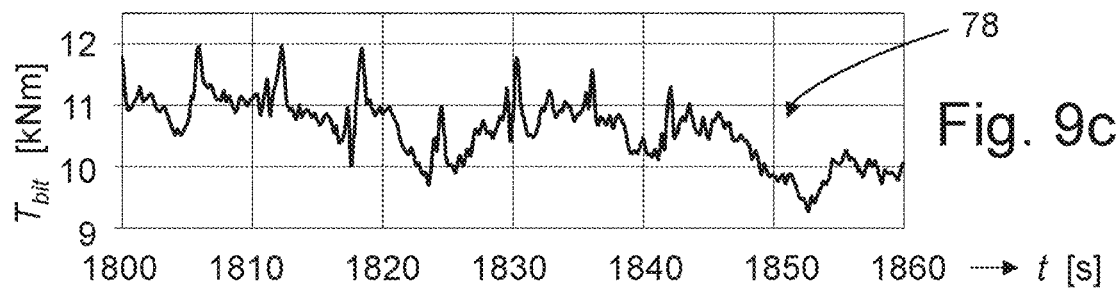

The contributions of the top end drive speed $\omega_{td}$ and commanded top end drive torque $T_{ref}$ to the bit torque $T_{bit}$ calculated in accordance with the present disclosure for the measurement data obtained from the borehole drilling equipment simulation mentioned above with reference to FIGS. 6 and 7, are graphically illustrated in FIGS. 9a, 9b and 9c. Graph 76 in FIG. 9a illustrates the contribution of the top end drive speed $\omega_{td}$ and graph 77 in FIG. 9b shows the contribution of the commanded torque $T_{ref}$, both over a selected time period t, including the application of stick-slip mitigation control from t=disclosure s.

Figure 9D:
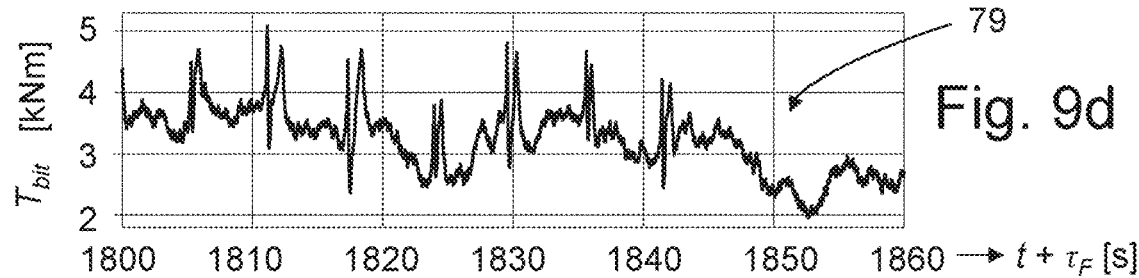

The calculated bit torque shown in FIG. 9c is the sum of the contributions of FIGS. 9a and 9b. Graph 79 in FIG. 9d shows the measured bit torque $T_{bit}$. For comparison reasons, the measured bit torque is displayed corrected for the time delay term $\tau_F$ of 2 seconds used in the calculation of the bit torque. The difference in the torque values of graphs 78 and 79 results from Coulomb friction, i.e. a steady torque value that is not taken into account in the calculations performed. When Coulomb friction is to be taken into account, same may be estimated as a fixed value of, generally, a few Nm/meter or a few kNm/kilometer drill string length and may be added to the external mud related friction. In the present example, the Coulomb friction amounts 7.2 kNm. The accuracy and trend of the calculated value of the bit torque is remarkably.

The graphs of FIGS. 7c and 9c show the bit speed and bit torque. However, as explained above, at each position down hole, i.e. along the drill string, down hole speed $\omega_{dh}(t)$ and down hole torque $T_{dh}(t)$ may be calculated in accordance with the present disclosure, from synthesizing respective impulse response functions $H_{11}(t)$, $H_{12}(t)$, $H_{21}(t)$ and $H_{22}(t)$ of the modified spectral transfer matrix components $M_{11}(s)$, $M_{12}(s)$, $M_{21}(s)$ and $M_{22}(s)$.

The positions are each time referred to a set fixed point of the borehole drilling equipment, such as the plane of the earth surface in which a borehole is drilled or another fixed reference position, such as the top end of the drill string. The impulse response functions for a particular position may be calculated in advance, i.e. in a first processing step, while the respective convolution operations are performed in a second processing step once the top end drive speed and top end drive torques are obtained.

The down hole speed and down hole torque for the plurality of positions may be presented graphically, while drilling, at a display device in both a two-dimensional (2D) or three-dimensional or a spatial (3D) diagram as a function of time and position.

Figure 10A:
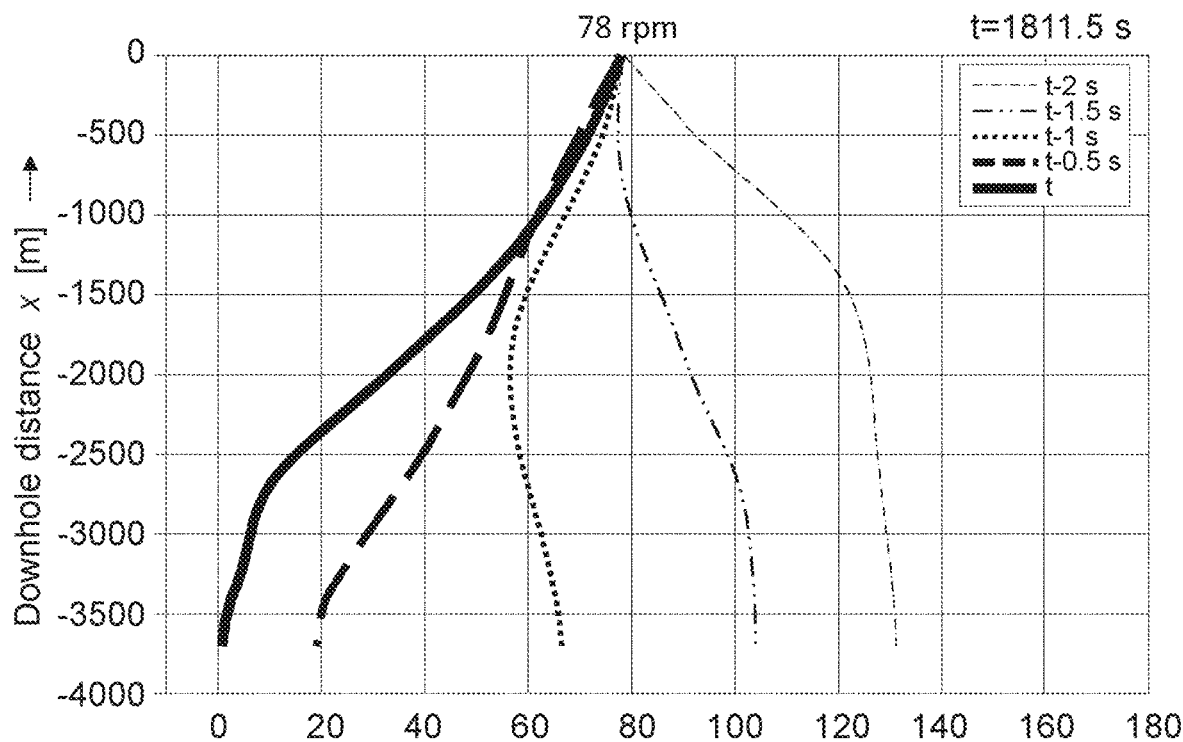
FIGS. 10a and 10b illustrate graphically, at different time instances, the down hole speed without and with applying stick-slip mitigating control, respectively, estimated in accordance with the present disclosure.
Figure 10B:
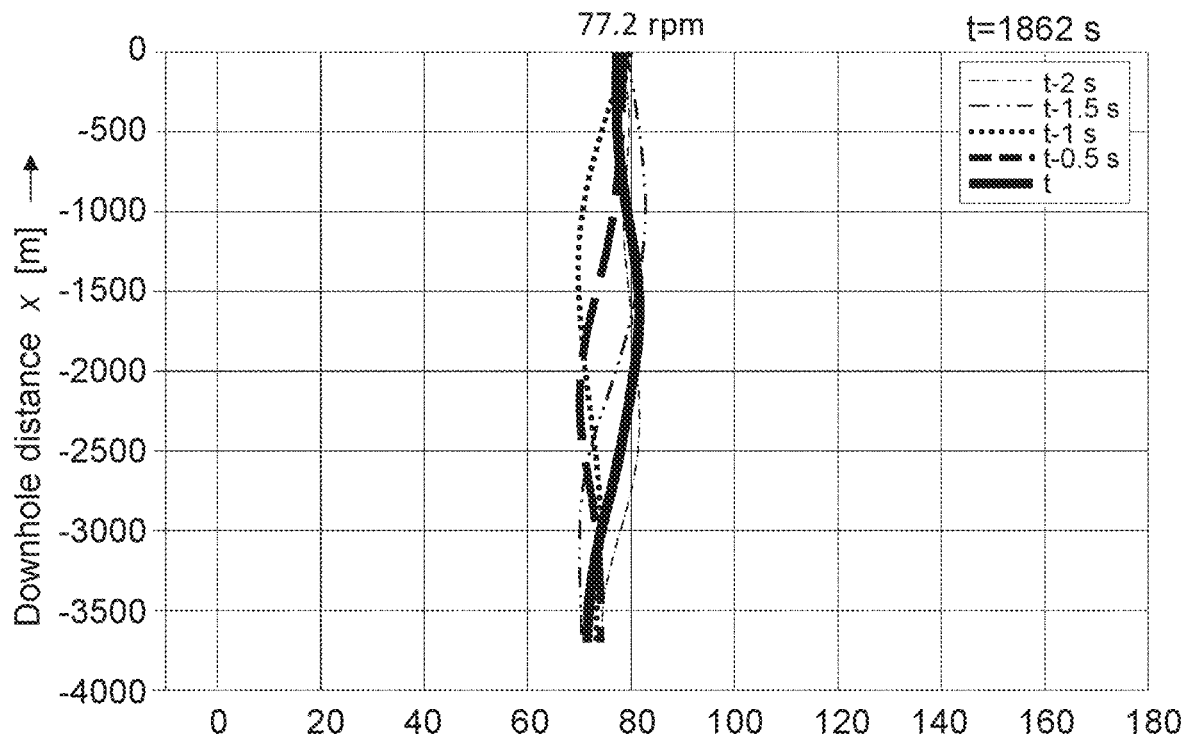

FIGS. 10a and 10b illustrate in a 2D representation the estimated downhole speed as a function of the down hole position x, i.e. along the drill string, at a particular time t and four points in time earlier, each with 0.5 seconds difference, as indicated in the legend with the graphs. FIG. 10a represents the down hole speed at t=1811.5 s, that is prior to the application of stick-slip mitigation control at t=1840 s. FIG. 10b represents the down hole speed at t=1862 s, that is after the application of stick-slip mitigation control at t=1840 s. At the top of the graphs the momentary speed of the top drive is indicated, i.e. the speed at time t=1811.5 s and t=1840 s, respectively.

Figure 11:
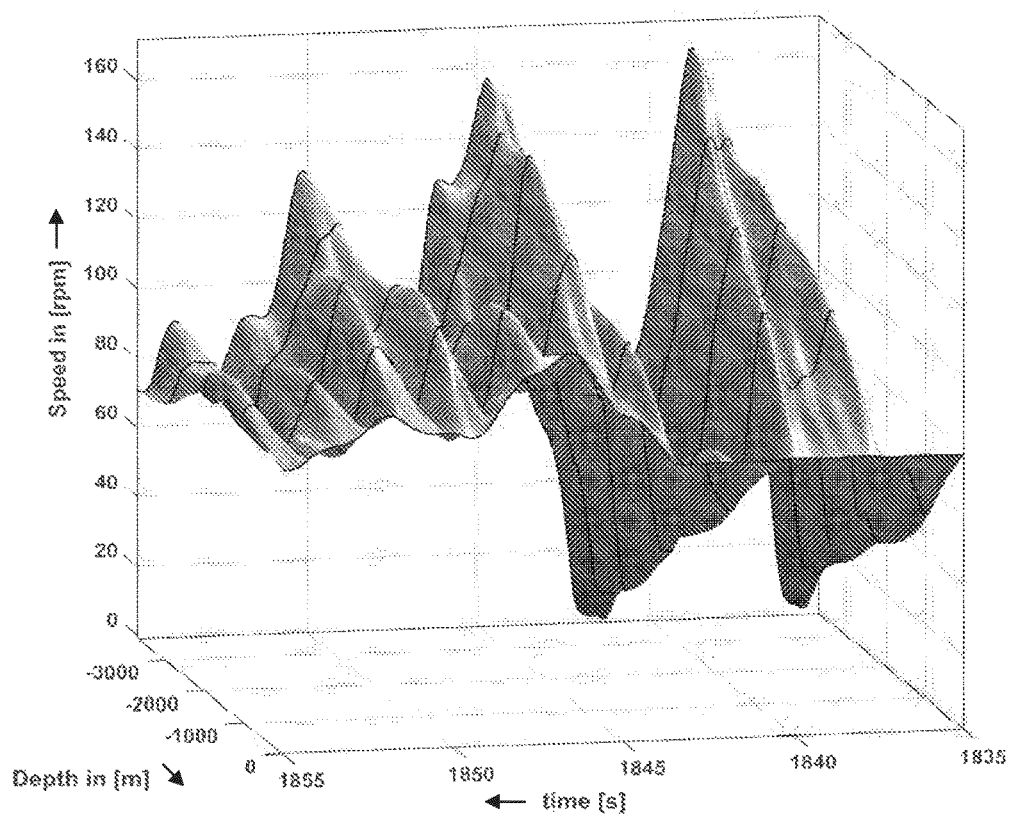
FIG. 11 illustrates graphically, in a spatial or 3D diagram, the down hole speed while drilling, estimated in accordance with the present disclosure, for a selected time period before and after applying stick-slip mitigating control.
Figure 12:
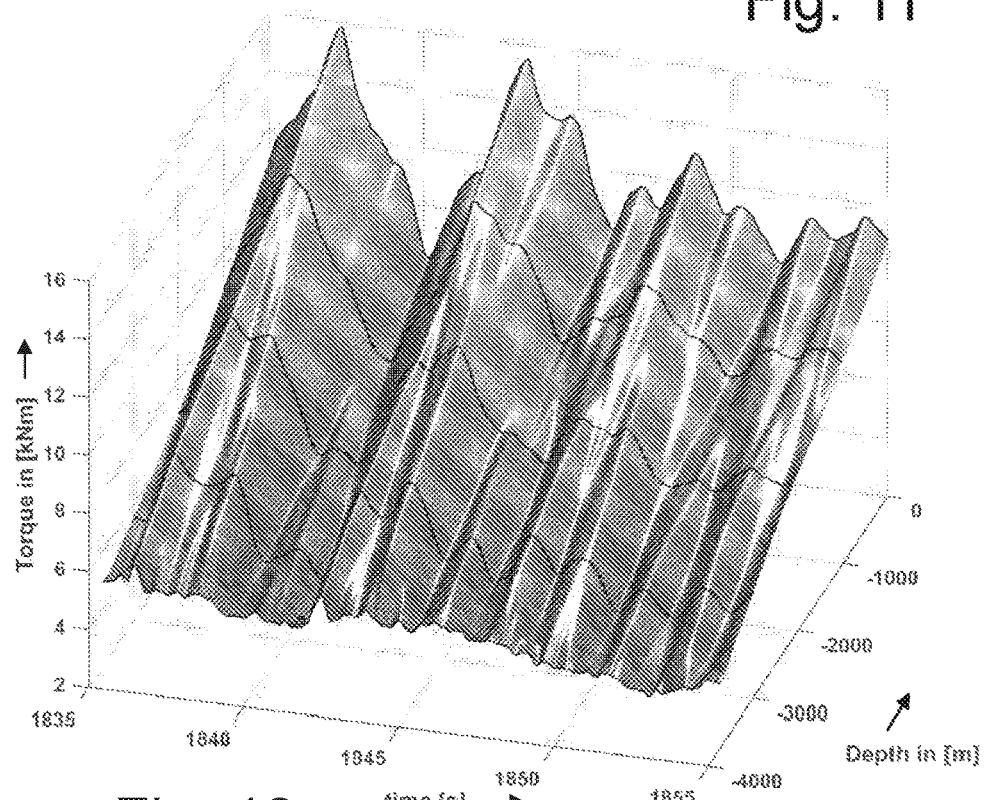
FIG. 12 illustrates graphically, in a spatial or 3D diagram, the down hole torque, estimated in accordance with the present disclosure, for a selected time period before and after applying stick-slip mitigating control.

In the 3D representation of FIG. 11, down hole speed is illustrated in function of the down hole distance x during a time interval t including the application of stick-slip mitigation control at t=1840 s, estimated, i.e. calculated in accordance with the present disclosure from top end measured data obtained of the simulation test system. FIG. 12 illustrates the down hole torque in function of the down hole distance x during a time interval t including the application of stick-slip mitigation control at t=1840 s, and calculated/estimated in accordance with the present disclosure from top end measured data obtained of the simulation test system It will be appreciated that such speed wave and/or down hole torque pattern, illustrated by FIGS. 10a, 10b, 11 and 12, may be displayed in near real time at a display of an operators console or the like, either on site or remote, such to continuously monitor the speed and torque acting at the drill string and the drill bit.

It will be appreciated that the method according to the present disclosure is not only able to show and detect bit stick-slip, but is also able to detect stick-slip along the drill string, including higher mode stick-slip.

As mentioned in the summary part, the relevant mechanical and string geometry operational parameters, for calculating the transfer matrix components may be obtained manually and/or digitally under operator control from a spread-sheet or table or the like. In a more sophisticated implementation, the method can be performed completely automatically and autonomously, while drilling commences, without the intervention of an operator or other skilled personnel, by acquiring the relevant mechanical and string geometry operational parameters from applying the teachings of the International Patent Application WO2014/098598, filed in the name of applicant, by applying at the commanded top en drive torque $T_{ref}$ a time-varying frequency torque control signal, such as illustrated in FIG. 2 by input signal $T_{sweep}$, dashed arrow 42, and summation operation 41 at the input of the transfer function D(s) 30 and processing the obtained top end drive speed in an operational parameter control system 87 configured accordingly, see FIG. 14.

Figure 13:
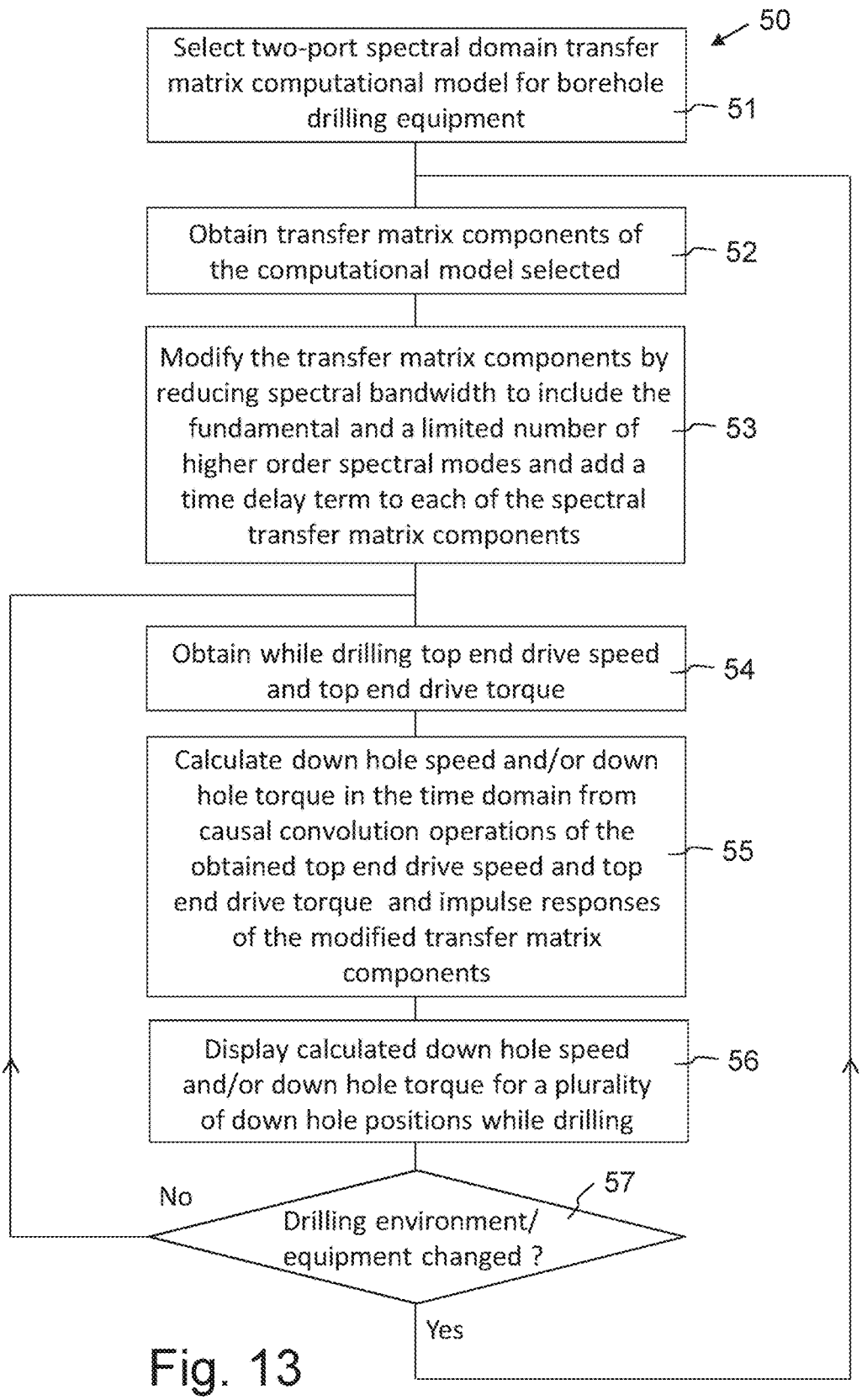
FIG. 13 shows a simplified flow chart diagram for automatically determining the down hole speed and/or down hole torque from a computational model of borehole drilling equipment in accordance with the present disclosure.

FIG. 13 illustrates, by a simplified flow chart 50, the steps to be processed by a digital processor, computer or other data processing device, for estimating at least one of the down hole speed and/or down hole torque in accordance with an example of the present disclosure and presenting same, for example by displaying, or otherwise using such estimations for the purpose of drilling a borehole in an earth formation. The direction of flow is assumed from the top to the bottom of the sheet. Other directions are indicated by a respective arrow.

As a first step, a suitable computational model representing the dynamic part including damping and friction of borehole drilling equipment 10 comprised by the drive system or top drive 15, drill string 12 and BHA 11 is selected, i.e. block 51 "Select two-port spectral domain transfer matrix computational model for borehole drilling equipment", that is such that the down hole speed and down hole torque are the dependent variables and the rotational top end drive speed and top end drive torque are the independent variables. In general this computational model, such as the transmission line model disclosed above with reference to FIGS. 4 and 5, is selected once.

Next, as shown by block 52, "Obtain transfer matrix components of the computational model selected", for a particular distance downhole or a particular length along the drill string, the values of the transfer matrix components are obtained from the mechanical properties of the drill string 12, top drive 15 and BHA 11, including friction and damping values, for example as disclosed above with reference to the transmission line model and equations 2-9, 17 and 18.

The transfer matrix components thus obtained are modified to admit a reduced number of higher spectral modes in the transfer matrix components, besides the fundamental mode. Further a time delay term is added to each transfer matrix component in the spectral domain, to enable causal time domain solutions. This as illustrated by block 55, "Modify the transfer matrix components by reducing spectral bandwidth to include the fundamental and a limited number of higher order spectral modes and add a time delay term to each of the spectral transfer matrix components". Reference is made to the spectral transfer matrix components $M_{11}(s)$, $M_{12}(s)$, $M_{21}(s)$ and $M_{22}(s)$ and $Mb_{11}(s)$, $Mb_{12}(s)$, $Mb_{21}(s)$ and $Mb_{22}(s)$ detailed above.

During drilling, with a particular sampling frequency to be selected, such as for example in the range of 4-20 ms, top end drive speed is obtained, such as measured by a speed sensor 21, concurrently with a value representative for the top end drive torque, i.e. block 54 "Obtain while drilling top end drive speed and top end drive torque". However, any other suitable speed measurement technique or equipment may be used, such as sensorless estimating the top end drive speed from the voltage and current fed to an electric drive system motor 18. As explained above, the top end drive torque may be represented by the commanded top end drive torque set point $T_{ref}$.

Next, the down hole speed/bit speed and down hole torque/bit torque are calculated in the time domain, as illustrated by block 55, "Calculate down hole speed and/or down hole torque in the time domain from causal convolution operations of the obtained top end drive speed and top end drive torque and impulse responses of the modified transfer matrix components". The impulse responses are obtained by inverse spectral to time domain transformation which may be performed, by the computer using an Inverse Fast Fourier Transformation, IFFT, algorithm, for example. Calculating the down hole speed/bit speed and/or down hole torque/bit torque from a convolution operation processing is advantageous in view of the short range over which the impulse response functions of the matrix components contribute.

The thus computed speeds and torques may be presented in near real time to a driller or supervisor or other body, e.g. by displaying same, and/or recorded for further analysis, i.e. block 56, "Display calculated down hole speed and/or down hole torque for a plurality of down hole positions while drilling".

When in the course of a drilling operation the length of the drill string 12 is increased, for example, or if the drilling environment significantly changes, decision block 57, "Drilling environment/equipment changed?", outcome "Yes", the process as illustrated by blocks 52-56 is repeated to obtain adjusted transfer matrix components, if applicable. Otherwise, decision block 59 result "No", the calculation and presentation of the down hole speed and/or down hole torques continues from the obtained top end drive speed and torque.

It will be appreciated that the inertia $J_{td}$ of the drive system 15 and the inertia $J_{bha}$ of the bottom hole assembly 11 will not have to be established anew each time the drill string is extended. The inertia $J_{td}$ of the drive system may also be known beforehand from data provided by the operator of the borehole drilling equipment, for example, such to considerable ease the process. Adjusted transfer matrix components may be obtained as disclosed above.

As mentioned in the summary part above, for computing the transfer matrix components of a selected computation model and their time-domain equivalents and impulse response functions, spectral domain transformations and inverse or spectral to time domain transformations, matrix manipulations, convolution operations and filter operations, the computer may be equipped with commercially available computer software such as MATLAB™ or any other commercially available computer program for computing spectral domain transformations and inverse transformations of transfer functions and impulse response functions of a dynamic system, matrix manipulations, convolution operations and filter operations, as well as proprietary discrete time modelled software programs written, for example, in C, C+ or C++.

Figure 14:
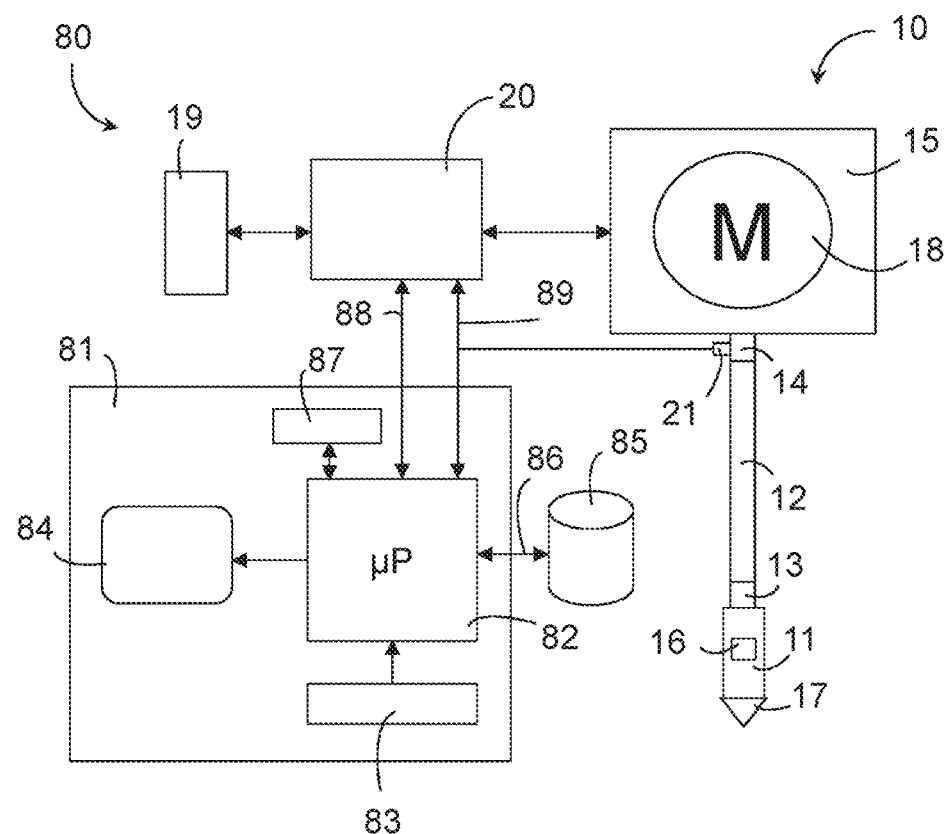
FIG. 14 is a schematic representation of borehole drilling equipment equipped for operating in accordance with the present disclosure.

FIG. 14 schematically shows a device 80 for automatically estimating down hole speed and/or down hole torque of borehole drilling equipment 10, operated either on-bottom or off-bottom, while drilling a borehole. In addition to the borehole drilling equipment 10 shown in FIG. 1, a computer controlled drilling operation observer system 81 is provided. The observer system 81 comprises a computer or electronic processing device 82, an input interface 83, such as keyboard, a touch screen or the like, for selecting a representative two-port spectral domain transfer matrix computational model of the borehole drilling equipment 10 and/or for inputting operational parameter values, such as tuning parameters of the speed controller 20, if any, of the borehole drilling equipment 10 for determining transfer matrix components of the computational model. Speeds and torques calculated by the processing device 82 may be provided at an output interface 84, such as a graphical display, a printer or plotter, or a data evaluation module for evaluating the results obtained.

The computational model, operational and tuning parameters, filter functions, time delay terms and other values in accordance with the present disclosure, to be used by the observer system 81, may be stored at and retrieved from a database 85, accessible from the observer system 81. The database 85 may be remote from the observer system 81 and connected by a communication network 86, for example, or may be comprised by a medium, including a transitory and non-transitory medium, that can be read by the computer or processing device 82.

The rotational top end speed of the drill string 12, for example measured at its top end 14 by a speed indicator or speed sensor 21, is provided via input 89 to the processing device 82. The top end drive torque may be obtained from the speed controller 20 through a data input/output 88 for providing tuning parameters and/or feedback to the observer system 81.

The processing device 82 is programmed, or may be programmed from a computer program product having a medium storing computer program code that can be read by the processing device 82, to calculate an estimated down hole speed and/or down hole torque from the obtained rotational top end drive speed and top end drive torque in accordance with the present disclosure. Further, the processing device 82 may be arranged to operate automatically and autonomously for obtaining the operational parameter values required for calculating the transfer matrix components by implementing an operational parameter control system in accordance with Patent Application WO2014/098598, filed in the name of applicant, which is herein incorporated by reference, and schematically indicated by reference numeral 87.

The observer system 81 may be arranged or disposed remote from the borehole drilling equipment 10, such that the connections 88, 89 with the speed controller 20 may be arranged as a single data network connection or a connection with a telecommunication network, either wired or wireless.

The speed controller 20 and/or a separate electronic controller and/or the system 81 may be further arranged for applying stick-slip mitigation control disclosed in the International Patent Application WO2013/062409, filed in the name of applicant, which is herein incorporated by reference.

The present invention and disclosure is not limited to the embodiments as disclosed above, and can be modified and enhanced by those skilled in the art within the scope of the present disclosure as disclosed in the appended claims, without having to apply inventive skills.

The invention claimed is:

1. A method of estimating at least one of down hole speed and down hole torque of borehole drilling equipment while drilling a borehole in an earth formation, said borehole drilling equipment comprising a rotational drive system, a drill string having a bottom hole assembly comprising a drill bit and a top end coupled to said rotational drive system, and a speed controller arranged for controlling rotational top end drive speed by commanding a top end drive torque, the method being performed in a computer and comprising the steps of:

obtaining transfer matrix components of a two-port spectral domain transfer matrix computational model of said borehole drilling equipment, said computational model including damping properties of said borehole drilling equipment, wherein said down hole speed and down hole torque being dependent variables and said rotational top end drive speed and top end drive torque being independent variables;

obtaining, while drilling, said rotational top end drive speed and top end drive torque, and calculating, from said obtained transfer matrix components, said top end drive speed and said top end drive torque at least one of said down hole speed and down hole torque of said borehole drilling equipment, wherein said step of calculating comprises:

reducing spectral bandwidth of said calculation, said reduced bandwidth being selected to include a limited number of higher order spectral modes in said calculation, applying, in said spectral domain, a time delay term to said calculation, said time delay term being selected to enable a causal time domain solution, and calculating at least one of said down hole speed and down hole torque of said borehole drilling equipment from applying said reduced bandwidth and added time delay term.

2. The method according to claim 1, wherein said spectral bandwidth reduction and said time delay term are applied by modifying said transfer matrix components by:

reducing spectral bandwidth of said transfer matrix components, said reduced bandwidth being selected to include a limited number of higher order spectral modes in said transfer matrix components, adding, in said spectral domain, a time delay term to each of said transfer matrix components, said time delay being selected to enable a causal time domain solution, and calculating at least one of said down hole speed and down hole torque of said borehole drilling equipment using said modified transfer matrix components.

3. The method according to claim 2, wherein at least one of said down hole speed and down hole torque of said borehole drilling equipment are calculated, by said computer, in a causal convolution operation processing said obtained rotational top end drive speed and top end drive torque and impulse response functions of said modified transfer matrix components over a period of time including one round trip time in said drill string.

4. The method according to claim 2, wherein at least one of said down hole speed and down hole torque are provided, by said computer, for a plurality of different positions along said drill string length or borehole by calculating, for each position, impulse response functions of said modified transfer matrix transfer function components, and by processing in a causal convolution operation from each of said calculated impulse response functions for a respective position and said obtained rotational top end drive speed and top end drive torque at least one of said down hole speed and down hole torque at a respective position.

5. The method according to claim 4, wherein said at least one of said down hole speed and down hole torque provided for said plurality of positions are represented graphically, while drilling, at a display device in a spatial diagram as a function of time and position.

6. The method according to claim 1, wherein said spectral bandwidth is reduced based on at least one of damping properties and length of said drill string.

7. The method according to claim 1, wherein said spectral bandwidth is reduced by applying an nth order low-pass Bessel filter operation, wherein n≥4, and tapering, wherein said time delay term further comprises a time delay part representative of a time delay caused by said Bessel filter operation and n is a positive integer.

8. The method according to claim 1, wherein said time delay term equals at least 1 second per 3000 meter of drill string length.

9. The method according to claim 1, wherein said down hole speed and down hole torque are rotational bit speed and bit torque, respectively.

10. The method according to claim 1, wherein said two-port spectral domain transfer matrix computational model of said borehole drilling equipment comprises a two-port spectral domain transfer matrix, composed of a single or composite symmetrical spectral domain transmission line equivalent drill string computational model including drill string inertia, stiffness and damping properties of said drill string in said borehole, bottom hole assembly inertia and top end drive inertia.

11. The method according to claim 10, wherein said two-port spectral domain transfer matrix computational model is represented by:

$$\begin{pmatrix} \omega_{dh} \\ T_{dh} \end{pmatrix} = \begin{bmatrix} M_{11}(s) & M_{12}(s) \\ M_{21}(s) & M_{22}(s) \end{bmatrix} \begin{pmatrix} \omega_{td} \\ T_{ref} \cdot e^{-s\tau_d} \end{pmatrix}$$

wherein: M11(s), M12(s), M21(s) and M22(s) represent bandwidth limited and time delay term modified spectral transfer matrix transfer function components,
$\omega_{dh}$ represents down hole speed,
$T_{dh}$ represents down hole torque,
$\omega_{td}$ represents obtained top end drive speed,
$T_{ref}$ represents commanded top end drive torque,
$\tau_d$ represents speed controller time delay, and
s represents Laplace transform operator.

12. The method according claim 1, wherein the method is performed in a computer separate from said borehole drilling equipment.

13. A computer readable product, storing computer program code on a non-transitory medium that can be read by a computer, wherein said computer program code is arranged to carry out the method according to claim 1 when said computer is operatively connected to borehole drilling equipment and said program code is executed by said computer.

14. A device for estimating at least one of down hole speed and down hole torque of borehole drilling equipment for drilling a borehole in an earth formation, said borehole drilling equipment comprising a rotational drive system, a drill string having a bottom hole assembly comprising a drill bit and a top end coupled to said rotational drive system, and a speed controller arranged for controlling rotational top end drive speed by commanding a top end drive torque, said device comprising a computer controlled drilling operation observer system arranged for:
obtaining transfer matrix components of a two-port spectral domain transfer matrix computational model of said borehole drilling equipment, said computational model including damping properties of said borehole drilling equipment, and wherein said down hole speed and down hole torque being dependent variables and said rotational top end drive speed and top end drive torque being independent variables;
obtaining, while drilling, said rotational top end drive speed and top end drive torque, and
calculating, from said obtained transfer matrix components, said top end drive speed and said top end drive torque at least one of said down hole speed and down hole torque of said borehole drilling equipment,
wherein said calculating comprises:
reducing spectral bandwidth of said calculation, said reduced bandwidth being selected to include a limited number of higher order spectral modes in said calculation,
applying, in said spectral domain, a time delay term to said calculation, said time delay term being selected to enable a causal time domain solution, and
calculating at least one of said down hole speed and down hole torque of said borehole drilling equipment from applying said reduced bandwidth and added time delay term.

15. The device according to claim 14, wherein said computer controlled drilling operation observer system is arranged for applying said spectral bandwidth reduction and said time delay term by modifying said transfer matrix components by:
reducing spectral bandwidth of said transfer matrix components, said reduced bandwidth being selected to include a limited number of higher order spectral modes in said transfer matrix components;
adding, in said spectral domain, a time delay term to each of said transfer matrix components, said time delay being selected to enable a causal time domain solution, and
calculating at least one of said down hole speed and down hole torque of said borehole drilling equipment using said modified transfer matrix components.

16. The device according to claim 15, wherein said computer controlled drilling operation observer system is arranged for calculating, for each position of a plurality of different positions along said drill string length or borehole, impulse response functions of said modified transfer matrix transfer function components, and by processing in a causal convolution operation from each of said calculated impulse response functions for a respective position and said obtained rotational top end drive speed and top end drive torque at least one of said down hole speed and down hole torque at a respective position.

17. The device according to claim 16, further comprising a display device, wherein said computer controlled drilling operation observer system is arranged for graphically representing said at least one of said down hole speed and down hole torque provided for said plurality of positions, while drilling, at said display device in a spatial diagram as a function of time and position, in particular in a speed wave pattern or torque wave pattern diagram.

18. The device according to claim 14, wherein said computer controlled drilling operation observer system is arranged for reducing said spectral bandwidth by applying an nth order low-pass Bessel filter operation, wherein n≥4, and tapering, and adding to said time delay term a time delay part representative of a time delay caused by said Bessel filter operation, and wherein n is a positive integer.

19. The device according to claim 14, operatively connected to or incorporated in said speed controller for obtaining said top end drive speed and top end drive torque.

20. Borehole drilling equipment for drilling a borehole in an earth formation, said borehole drilling equipment comprising a rotational drive system, a drill string having a bottom hole assembly comprising a drill bit and a top end coupled to said rotational drive system, a speed controller arranged for controlling a commanded torque and rotational drive speed of said top end, and a device for estimating at least one of down hole speed and down hole torque of said borehole drilling equipment in accordance with claim 14.

* * * * *